US012640864B2

(12) United States Patent
Yu et al.

(10) Patent No.: US 12,640,864 B2
(45) Date of Patent: May 26, 2026

(54) METHOD AND DEVICE USED IN COMMUNICATION NODE USED FOR WIRELESS COMMUNICATION

(71) Applicant: APOGEE NETWORKS, LLC, Plano, TX (US)

(72) Inventors: Qiaoling Yu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 374 days.

(21) Appl. No.: 18/218,109

(22) Filed: Jul. 5, 2023

(65) Prior Publication Data

US 2023/0361949 A1    Nov. 9, 2023

Related U.S. Application Data

(63) Continuation of application No. PCT/CN2022/072843, filed on Jan. 20, 2022.

(30) Foreign Application Priority Data

Jan. 20, 2021    (CN) ......................... 202110072084.X

(51) Int. Cl.
*H04L 5/00*        (2006.01)
*H04W 74/00*    (2009.01)
*H04W 74/0833*    (2024.01)

(52) U.S. Cl.
CPC ......... *H04L 5/0044* (2013.01); *H04W 74/002* (2013.01); *H04W 74/0833* (2013.01)

(58) Field of Classification Search
None
See application file for complete search history.

(56) References Cited

U.S. PATENT DOCUMENTS 12,120,641 B2    10/2024    Liu et al.
2016/0157271 A1    6/2016    Zhang et al.
(Continued)

FOREIGN PATENT DOCUMENTS

| CN | 111867120 A | 10/2020 |
| WO | 2017065548 A1 | 4/2017 |
| WO | 2020198980 A1 | 10/2020 |

OTHER PUBLICATIONS

ISR received in application No. PCT/CN2022/072843 dated Apr. 20, 2022.

(Continued)

*Primary Examiner* — Saumit Shah
(74) *Attorney, Agent, or Firm* — Volpe Koenig

(57)    ABSTRACT

The present application discloses a method and a device in a communication node for wireless communications. A communication node receives a first signaling, the first signaling being used to determine K1 preamble resource group(s); determines a first payload; determines a first preamble resource group subset out of the K1 preamble resource group(s) according to a size of the first payload; selects a first preamble resource in the first preamble resource group subset, and transmits a first message; receives a second message; and transmits a third message on a first resource pool; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel.

19 Claims, 5 Drawing Sheets

100    First node 101    receiving first signaling, the first signaling being used to determine K1 preamble resource group(s);

102    determining first payload; determining first preamble resource group subset out of the K1 preamble resource group(s) according to size of the first payload; selecting first preamble resource in the first preamble resource group subset, and transmitting first message; and transmitting third message on first resource pool;

103    receiving second message as a response to the action of transmitting first message;

(56)                References Cited

U.S. PATENT DOCUMENTS

| | | | |
|---|---|---|---|
| 2020/0029366 A1 | 1/2020 | Xiong et al. | |
| 2020/0314913 A1 | 10/2020 | Rastegardoost et al. | |
| 2020/0374899 A1* | 11/2020 | Ohta | H04W 72/569 |
| 2021/0352617 A1* | 11/2021 | Choe | H04W 76/30 |
| 2023/0072763 A1* | 3/2023 | Kim | H04W 74/0841 |
| 2023/0083993 A1* | 3/2023 | Rune | H04W 74/0833 |
| | | | 370/329 |
| 2023/0088082 A1* | 3/2023 | Lin | H04W 74/0836 |
| | | | 370/329 |
| 2024/0080904 A1* | 3/2024 | Agiwal | H04L 5/0044 |

OTHER PUBLICATIONS

Vivo Supporting Small Data Transmission via RA Procedure 3GPP TSG-RAN WG2 Meeting#111-electronic R2-2006551 Aug. 28, 2020.

Interdigital Inc., "Logical Channel Selection Restrictions in LCP," 3GPP TSG-RAN WG2 NR AH#2, R2-1706681, Qingdao, P.R. China (Jun. 27-29, 2017).

Third Generation Partnership Project, "Technical Specification Group Radio Access Network; Evolved Universal Terrestrial Radio Access (E-UTRA); Medium Access Control (MAC) protocol specification (Release 16)," 3GPP TS 36.321 V16.3.0 (Dec. 2020).

Third Generation Partnership Project, Technical Specification Group Radio Access Network; Evolved Universal Terrestrial Radio Access (E-UTRA); Radio Resource Control (RRC); Protocol specification (Release 16), 3GPP TS 36.331 V16.3.0 (Dec. 2020).

Third Generation Partnership Project, "Technical Specification Group Radio Access Network; NR; Multiplexing and channel coding (Release 16)," 3GPP TS 38.212 V16.4.0 (Dec. 2020).

Third Generation Partnership Project, "Technical Specification Group Radio Access Network; NR; Physical layer procedures for control (Release 16)," 3GPP TS 38.213 V16.4.0 (Dec. 2020).

Third Generation Partnership Project, "Technical Specification Group Radio Access Network; NR; Physical layer procedures for data (Release 16)," 3GPP TS 38.214 V16.4.0 (Dec. 2020).

Third Generation Partnership Project, "Technical Specification Group Radio Access Network; NR; Medium Access Control (MAC) protocol specification (Release 16)," 3GPP TS 38.321 V16.3.0 (Dec. 2020).

Third Generation Partnership Project, "Technical Specification Group Radio Access Network; NR; Radio Resource Control (RRC) protocol specification (Release 16)," 3GPP TS 38.331 V16.3.1 (Jan. 2021).

* cited by examiner

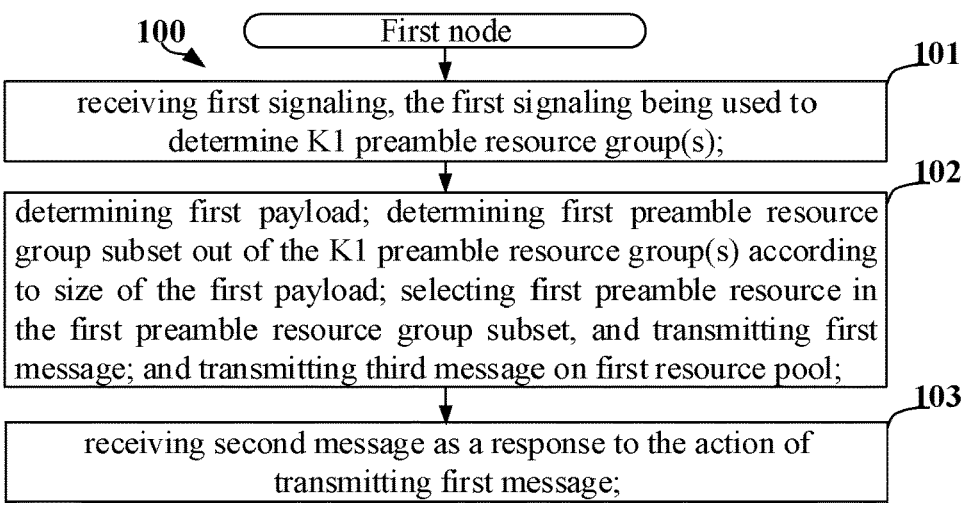

100

First node

101 receiving first signaling, the first signaling being used to determine K1 preamble resource group(s);

102 determining first payload; determining first preamble resource group subset out of the K1 preamble resource group(s) according to size of the first payload; selecting first preamble resource in the first preamble resource group subset, and transmitting first message; and transmitting third message on first resource pool;

103 receiving second message as a response to the action of transmitting first message;

FIG. 1

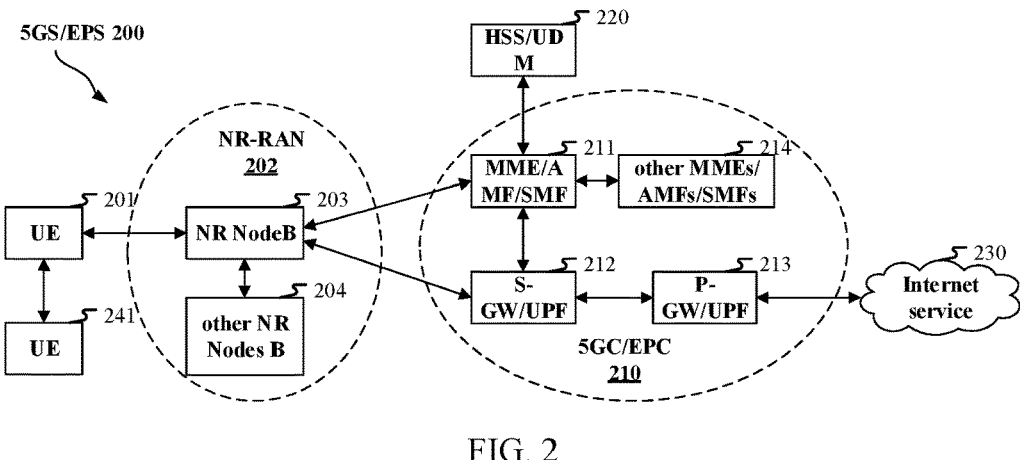

FIG. 2

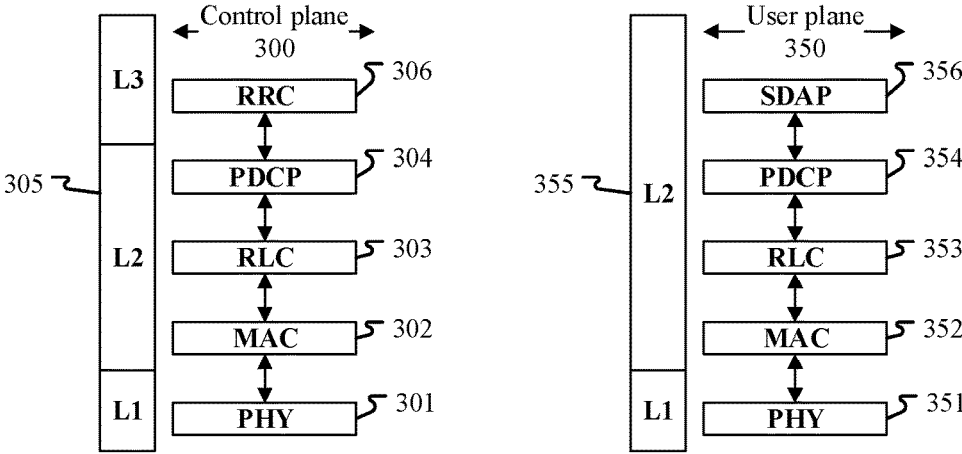

FIG. 3

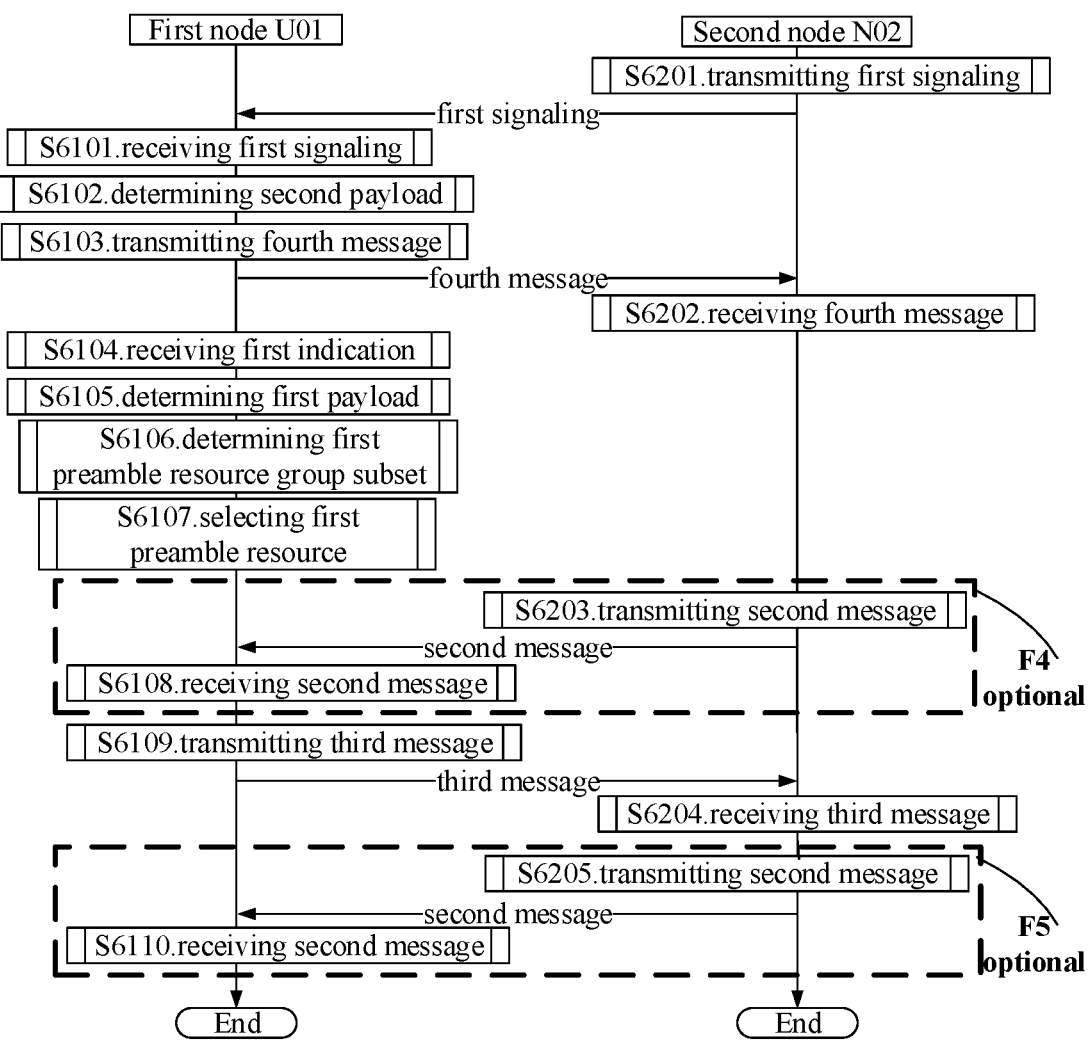

First node U01

Second node N02

S6201.transmitting first signaling

─first signaling─

S6101.receiving first signaling

S6102.determining second payload

S6103.transmitting fourth message

─fourth message─

S6202.receiving fourth message

S6104.receiving first indication

S6105.determining first payload

S6106.determining first preamble resource group subset

S6107.selecting first preamble resource

S6203.transmitting second message

─second message─

S6108.receiving second message

F4 optional

S6109.transmitting third message

─third message─

S6204.receiving third message

S6205.transmitting second message

─second message─

S6110.receiving second message

F5 optional

End                                    End

FIG. 6

S701. is first condition set being satisfied

No

Yes

S702(a).First payload comprises first sub-payload

S702(b).First payload does not comprise first sub-payload

FIG. 7

First preamble resource group

Preamble resource group #q

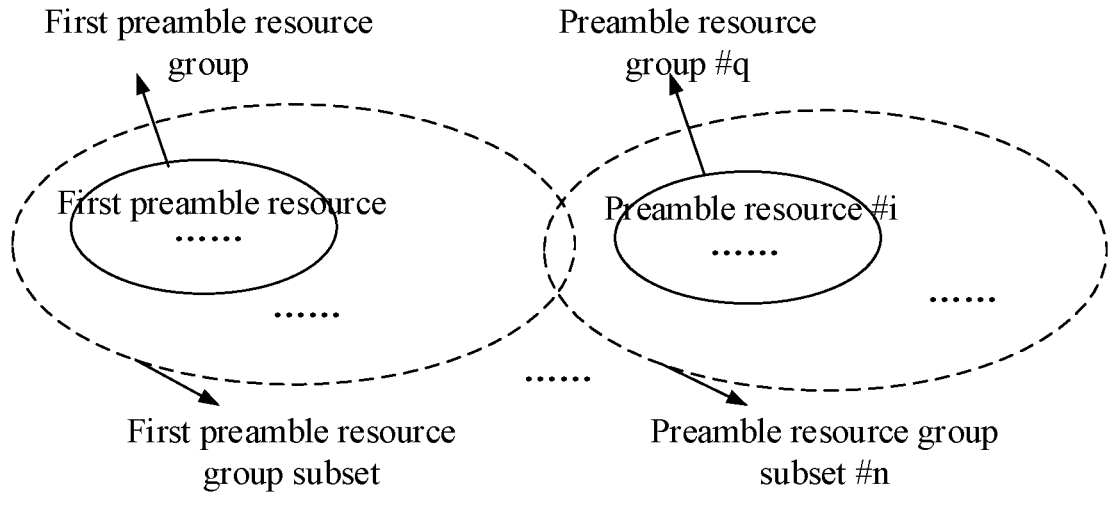

First preamble resource

Preamble resource #i

......

......

......

First preamble resource group subset

Preamble resource group subset #n

FIG. 8

First condition set   ←—related to—→   First priority

FIG. 9

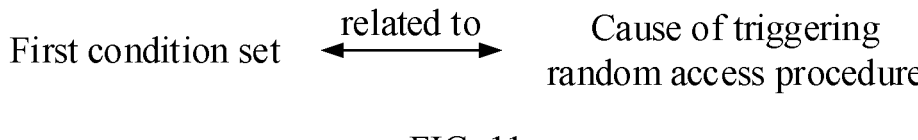

According to size of first payload and first offset   —determining→   First preamble resource group subset

FIG. 10

First condition set   ←—related to—→   Cause of triggering random access procedure

First receiver 1201

First transmitter 1202

First node

1300

Second transmitter 1301

Second receiver 1302

Second node

First principle ——used for——→ Selecting first preamble resource from first preamble resource group subset

METHOD AND DEVICE USED IN COMMUNICATION NODE USED FOR WIRELESS COMMUNICATION

CROSS REFERENCE TO RELATED APPLICATIONS

This application is the continuation of the international patent application No.PCT/CN2022/072843, filed on Jan. 20, 2022, and claims the priority benefit of Chinese Patent Application No. 202110072084.X, filed on Jan. 20, 2021, the full disclosure of which is incorporated herein by reference.

BACKGROUND

Technical Field

The present application relates to transmission methods and devices in wireless communication systems, and in particular to a method and a device for transmission of small-data packets.

Related Art

New Radio (NR) supports Radio Resource Control_I-NACTIVE (RRC_INACTIVE) State till the 3GPP Rel-16 in which data transmission is no longer supported in an RRC_INACTIVE State. When a User Equipment (UE) in an RRC_INACTIVE state has to transmit periodic or aperiodic small data packets that come infrequently, it firstly needs to resume its connection, which means to switch to an RRC-_CONNECTED state, and then transit to an RRC_INAC-TIVE state after completing data transmission. As was decided at the 3GPP RAN #86 meetings, a Work Item (WI) of "NR INACTIVE state Small Data Transmission (SDT)" will be conducted to study the technique of small data packet transmission in an RRC_INACTIVE state, including trans-mitting uplink data on pre-configured Physical Uplink Shared Channel (PUSCH) resources, or carrying data by means of either a Message 3 (Msg3) or a Message A (MsgA) in a Random Access (RA) procedure.

SUMMARY

The selection of preamble resource groups is dependent on the amount of data to be transmitted or/and the pathloss. In a random access procedure, the size of a DRB packet carried via an Msg3/MsgA is more flexible. When the SDT configures dedicated preamble resources, following the existing principle of selecting preamble resource groups is likely to result in a large number of users choosing the same group, which will accelerate the conflict or contention between random accesses. Therefore, it is necessary to enhance the principle of grouping random access preamble resources.

To address the above problem, the present application provides a solution. The statement above only took NR scenarios for example, though; this disclosure is also appli-cable to scenarios such as LTE or NB-IoT, where technical effects similar to those in LTE can be achieved. Additionally, the adoption of a unified solution for various scenarios contributes to the reduction of hardcore complexity and costs.

In one embodiment, interpretations of the terminology in the present application refer to definitions given in the 3GPP TS38 series.

In one embodiment, interpretations of the terminology in the present application refer to definitions given in the 3GPP TS36 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

It should be noted that if no conflict is incurred, embodi-ments in any node in the present application and the char-acteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first signaling, the first signaling being used to determine K1 preamble resource group(s);

determining a first payload; determining a first preamble resource group subset out of the K1 preamble resource group(s) according to a size of the first payload; select-ing a first preamble resource in the first preamble resource group subset, and transmitting a first message;

receiving a second message as a response to the action of transmitting a first message; and transmitting a third message on a first resource pool;

herein, each preamble resource group of the K1 preamble resource group(s) comprises at least one preamble resource, and each preamble resource in the K1 pre-amble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, a problem to be solved in the present application includes: how to avoid the situation where there is a large number of users selecting the same preamble group.

In one embodiment, a problem to be solved in the present application includes: how to enhance the success rate of random access of users with higher priority.

In one embodiment, characteristics of the above method include: the preamble grouping relating to the logical chan-nel.

In one embodiment, characteristics of the above method include: selecting a preamble group according to partial uplink data.

In one embodiment, characteristics of the above method include: preamble resources being divided into K1 preamble resource group(s).

In one embodiment, characteristics of the above method include: one or more of the K1 preamble resource group(s) being used to determine a first preamble resource group subset.

In one embodiment, an advantage of the above method includes: avoiding the situation where there is a large number of users selecting the same preamble group.

In one embodiment, an advantage of the above method includes: enhancing the success rate of random access of users with higher priority.

In one embodiment, an advantage of the above method includes: the preamble groups carrying more information.

According to one aspect of the present application, characterized in that the first preamble resource group subset is determined out of the K1 preamble resource group(s) according to a size of the first payload and a first offset; the first signaling indicates the first offset, the first offset comprising at least one bit.

According to one aspect of the present application, characterized in that the first condition set is related to a first priority, the first priority being used to determine an order of resource allocation of the first sub-payload.

According to one aspect of the present application, characterized in comprising:

determining a second payload; transmitting a fourth message on a second resource pool, the fourth message carrying all or part of the second payload; and receiving a first indication, the first indication being used to determine a failure of transmitting the fourth message;

herein, the first condition set comprises the action of receiving a first indication; there is at least one identical sub-payload shared by the first payload and the second payload.

According to one aspect of the present application, characterized in that the first condition set is related to a cause of triggering the random access procedure.

According to one aspect of the present application, characterized in comprising:

receiving a fifth message as a response to the action of transmitting a third message on a first resource pool;

herein, the third message comprises a buffer status report (BSR), while the fifth message indicates a third resource pool.

According to one aspect of the present application, characterized in that the first preamble resource is selected from the first preamble resource group subset according to a first principle, the first principle comprising the probability distribution of preamble resources in the first preamble resource group subset.

The present application provides a method in a second node for wireless communications, comprising:

transmitting a first signaling, the first signaling being used to determine K1 preamble resource group(s);

receiving a first message;

transmitting a second message as a response to the action of receiving a first message; and receiving a third message on a first resource pool;

herein, a first payload is determined; a first preamble resource group subset is determined out of the K1 preamble resource group(s) according to a size of the first payload, and a first preamble resource is selected from the first preamble resource group subset; each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

According to one aspect of the present application, characterized in that the first preamble resource group subset is determined out of the K1 preamble resource group(s) according to a size of the first payload and a first offset; the first signaling indicates the first offset, the first offset comprising at least one bit.

According to one aspect of the present application, characterized in that the first condition set is related to a first priority, the first priority being used to determine an order of resource allocation of the first sub-payload.

According to one aspect of the present application, characterized in comprising:

monitoring a fourth message on a second resource pool, the fourth message carrying all or part of a second payload;

herein, the second payload is determined; a first indication is received, the first indication being used to determine a failure of transmitting the fourth message; the first condition set comprises the action of receiving a first indication; there is at least one identical sub-payload shared by the first payload and the second payload.

According to one aspect of the present application, characterized in that the first condition set is related to a cause of triggering the random access procedure.

According to one aspect of the present application, characterized in comprising:

transmitting a fifth message as a response to the action of receiving a third message on a first resource pool;

herein, the third message comprises a buffer status report (BSR), while the fifth message indicates a third resource pool.

According to one aspect of the present application, characterized in that the first preamble resource is selected from the first preamble resource group subset according to a first principle, the first principle comprising the probability distribution of preamble resources in the first preamble resource group subset.

The present application provides a first node for wireless communications, comprising:

a first receiver, receiving a first signaling, the first signaling being used to determine K1 preamble resource group(s); and a first transmitter, determining a first payload; determining a first preamble resource group subset out of the K1 preamble resource group(s) according to a size of the first payload; selecting a first preamble resource in the first preamble resource group subset, and transmitting a first message; transmitting a third message on a first resource pool;

the first receiver, receiving a second message as a response to the action of transmitting a first message;

herein, each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

The present application provides a second node for wireless communications, comprising:

a second transmitter, transmitting a first signaling, the first signaling being used to determine K1 preamble resource group(s); and a second receiver, receiving a first message; receiving a third message on a first resource pool;

the second transmitter, transmitting a second message as a response to the action of receiving a first message;

herein, a first payload is determined; a first preamble resource group subset is determined out of the K1 preamble resource group(s) according to a size of the first payload, and a first preamble resource is selected from the first preamble resource group subset; each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, compared with the prior art, the present application is advantageous in the following aspects:

avoiding the situation where there is a large number of users selecting the same preamble group;

enhancing the success rate of random access of users with higher priority;

the preamble group carrying more information.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of transmission of a first signaling, a first message, a second message and a third message according to one embodiment of the present application.

FIG. 2 illustrates a schematic diagram of a network architecture according to one embodiment of the present application.

FIG. 3 illustrates a schematic diagram of a radio protocol architecture of a user plane and a control plane according to one embodiment of the present application.

FIG. 6 illustrates a flowchart of radio signal transmission according to another embodiment of the present application.

FIG. 7 illustrates a schematic diagram of whether a first condition set is satisfied being used to determine whether a first payload comprises a first sub-payload according to one embodiment of the present application.

FIG. 8 illustrates a schematic diagram illustrating a relation between a preamble resource group subset and a preamble resource group according to one embodiment of the present application.

FIG. 9 illustrates a schematic diagram of a first condition set being related to a first priority according to one embodiment of the present application.

FIG. 10 illustrates a schematic diagram of determining a first preamble resource group subset according to a size of a first payload and a first offset according to one embodiment of the present application.

FIG. 11 illustrates a schematic diagram of a first condition set being related to a cause of triggering a random access procedure according to one embodiment of the present application.

DESCRIPTION OF THE EMBODIMENTS

Figure 4:
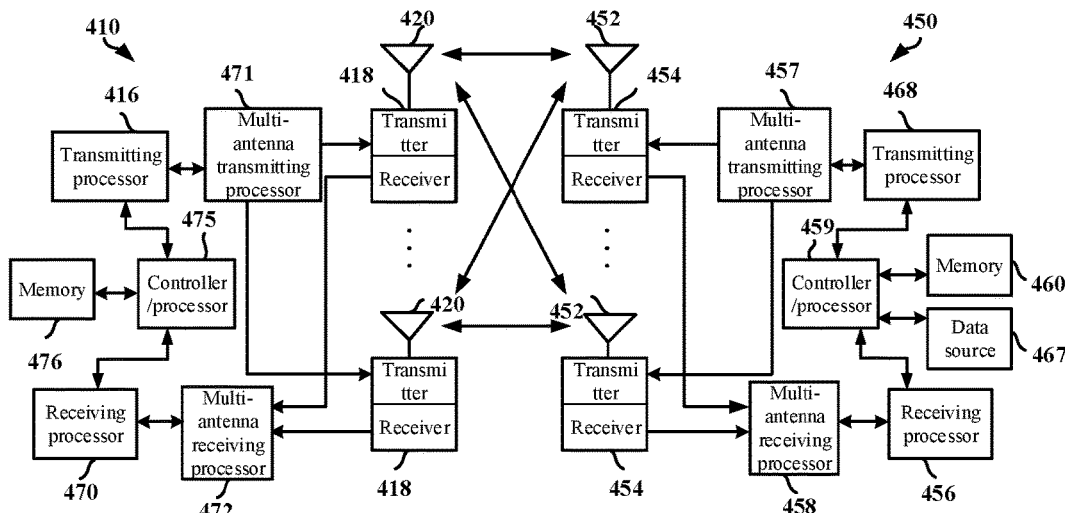
FIG. 4 illustrates a schematic diagram of a first communication device and a second communication device according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of transmission of a first signaling, a first message, a second message and a third message according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, a first node in the present application receives a first signaling in step 101, the first signaling being used to determine K1 preamble resource group(s); and determines a first payload in step 102; determines a first preamble resource group subset out of the K1 preamble resource group(s) according to a size of the first payload; selects a first preamble resource in the first preamble resource group subset, and transmits a first message; and in step 103, as a response to the action of transmitting a first message, receives a second message; and in step 104, transmits a third message on a first resource pool; herein, each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, the step S103 is taken before the step S104.

In one embodiment, the step S103 is taken after the step S104.

In one embodiment, the first signaling is transmitted via an air interface.

In one embodiment, the first signaling is transmitted via an antenna port.

In one embodiment, the first signaling is transmitted via an upper layer signaling.

In one embodiment, the first signaling is transmitted via a higher layer signaling.

In one embodiment, the first signaling comprises a Downlink (DL) signal.

In one embodiment, the first signaling comprises a Sidelink (SL) signal.

In one embodiment, the first signaling comprises an RRC message.

In one embodiment, the first signaling comprises a RRCReconfiguration message or a RRCConnectionReconfiguration message.

In one embodiment, the first signaling comprises a RRCResume message or a RRCConnectionResume message.

In one embodiment, the first signaling comprises a RRCConnectionSetup message or a RRCResume message.

In one embodiment, the first signaling comprises a SystemInformationBlockType2 or a SIB2 message.

In one embodiment, the first signaling comprises one Information Element (IE) in an RRC message, where a name of the IE includes RadioResourceConfigCommon or MobilityControlInfo.

In one embodiment, the first signaling comprises one IE in an RRC message, where a name of the IE includes at least one of RACH-ConfigCommonTwoStepRA, or SDT, or IDT, or Inactive, or transmission, or small, or data.

In one embodiment, the first signaling comprises one IE in an RRC message, where a name of the IE includes at least one of RACH-ConfigDedicated, or SDT, or IDT, or Inactive, or transmission, or small, or data.

In one embodiment, the first signaling comprises one IE in an RRC message, where a name of the IE includes at least one of RACH-ConfigGeneric, or SDT, or IDT, or Inactive, or transmission, or small, or data.

In one embodiment, the first signaling comprises one IE in an RRC message, where a name of the IE includes at least one of ConfigGenericTwoStepRA, or SDT, or IDT, or Inactive, or transmission, or small, or data.

In one embodiment, the first signaling comprises one IE in an RRC message, where a name of the IE includes CellGroupConfig.

In one embodiment, the first signaling comprises one IE in an RRC message, where a name of the IE includes UplinkConfigCommonSIB.

In one embodiment, the first signaling comprises one IE in an RRC message, where a name of the IE includes UplinkConfigCommon.

In one embodiment, the first signaling comprises one IE in an RRC message, where a name of the IE includes ServingCellConfig.

In one embodiment, the first signaling comprises one IE in an RRC message, where a name of the IE includes BWP-Uplink.

In one embodiment, the first signaling comprises one IE in an RRC message, where a name of the IE includes BWP-UplinkCommon.

In one embodiment, the first signaling comprises one IE in an RRC message, where a name of the IE includes RACH-ConfigCommon.

In one embodiment, the first signaling comprises one IE in an RRC message, where a name of the IE includes MsgA-ConfigCommon.

In one embodiment, the first signaling comprises one IE in an RRC message, where a name of the IE includes msgA-PUSCH-Config.

In one embodiment, the first signaling comprises one field in an RRC message, where a name of the field includes at least one of groupBconfigured, or GroupB-ConfiguredTwoStepRA.

In one embodiment, the first signaling comprises one field in an RRC message, where a name of the field includes at least one of groupBconfigured, or GroupB-ConfiguredTwoStepRA, or SDT, or Inactive Data Transmission (IDT), or Inactive, or transmission, or small, or data.

In one embodiment, the first signaling comprises one field in an RRC message, where a name of the field includes RACH-CE-LevelInfoList, or RACH-CE-LevelInfo, or preambleMappingInfo.

In one embodiment, the first signaling comprises one field in an RRC message, where a name of the field includes SpCellConfig.

In one embodiment, the phrase of the first signaling being used to determine K1 preamble resource group(s) comprises that: the first signaling is used for indicating K1 preamble resource group(s).

In one embodiment, the phrase of the first signaling being used to determine K1 preamble resource group(s) comprises that: the K1 preamble resource group(s) is/are obtained by means of one or more IEs in the first signaling.

In one embodiment, the phrase of the first signaling being used to determine K1 preamble resource group(s) comprises that: the K1 preamble resource group(s) is/are obtained by means of one or more fields in the first signaling.

In one embodiment, the phrase of the first signaling being used to determine K1 preamble resource group(s) comprises that: the first signaling is used for indicating (K1-1) threshold(s), the (K1-1) threshold(s) being used to determine the K1 preamble resource group(s).

In one subembodiment, when a Transfer block size (TBS) is no greater than or is smaller than a first threshold, the TBS is associated with a first preamble resource group.

In one subembodiment, when a TBS is no smaller than or is greater than an i-th threshold and the TBS is no greater than or is smaller than a (i+1)-th threshold, the TBS is associated with a (i+1)-th preamble resource group, where i is a positive integer no less than 1 and no greater than K1-2.

In one subembodiment, when a TBS is no smaller than or is greater than a (K1-1)-th threshold, the TBS is associated with a K1-th preamble resource group.

In one subembodiment, the i-th threshold is less than or is no greater than the (i+1)-th threshold.

In one embodiment, the phrase of the first signaling being used to determine K1 preamble resource group(s) comprises that: the first signaling is used for indicating K1 Coverage Enhancement level(s) (CE level(s)), the K1 CE level(s) being used to determine K1 preamble resource group(s).

In one subembodiment, one of the K1 CE level(s) corresponds to a range of one TBS.

In one subembodiment, one of the K1 CE level(s) is related to a Reference Signal Received Power (RSRP).

In one subembodiment, the K1 CE level(s) is/are pre-configured.

In one subembodiment, the first node itself selects a CE level out of the K1 CE level(s).

In one subembodiment, one of the K1 CE level(s) is associated with one of the K1 preamble resource group(s).

In one subembodiment, for the definition of the CE level, refer to 3GPP TS36.331.

In one subembodiment, K1 is equal to 4.

In one subembodiment, K1 is equal to 6.

In one embodiment, the K1 preamble resource group(s) is/are used for SDT.

In one embodiment, the K1 preamble resource group(s) is/are configured for SDT.

In one embodiment, any preamble resource in the K1 preamble resource group(s) is used for initiating a random access procedure for SDT.

In one embodiment, any preamble resource in the K1 preamble resource group(s) is associated with a preamble sequence.

In one embodiment, any preamble resource in the K1 preamble resource group(s) is associated with a random access occasion (i.e., a PRACH occasion).

In one embodiment, any preamble resource in the K1 preamble resource group(s) is associated with a frequency.

In one embodiment, any preamble resource in the K1 preamble resource group(s) comprises at least one of time domain, or frequency domain or code domain.

In one embodiment, the action of determining a first payload comprises: selecting the first payload.

In one embodiment, the action of determining a first payload comprises: judging the first payload.

In one embodiment, the action of determining a first payload comprises: determining a payload that can be used for selecting a preamble resource group subset.

In one embodiment, the action of determining a first payload comprises: determining one or multiple payloads that can be used for selecting a preamble resource group subset.

In one embodiment, the payload comprises a package.

In one embodiment, the payload comprises data.

In one embodiment, the payload comprises a valid payload.

In one embodiment, the payload is associated with one Logical Channel.

In one subembodiment, the Logical Channel is identified by a Logical Channel Identity (LCID).

In one subembodiment, the Logical Channel is associated with a MAC entity.

In one subembodiment, the Logical Channel is associated with an RLC entity.

In one subembodiment, the Logical Channel is associated with a PDCP entity.

In one embodiment, the first payload comprises valid data in all uplinks.

In one embodiment, the first payload comprises valid data to be transmitted in all uplinks.

In one embodiment, the first payload comprises valid data in partial uplinks.

In one embodiment, the first payload comprises valid data to be transmitted in partial uplinks.

In one embodiment, the first payload comprises data in a MAC buffer.

In one embodiment, the first payload comprises a MAC PDU.

In one embodiment, the first payload comprises a MAC subheader.

In one embodiment, the first payload comprises a MAC CE.

In one embodiment, the first payload comprises a MAC SDU.

In one embodiment, the first payload comprises data that any logical channel bears.

In one embodiment, the first payload comprises uplink data to be transmitted.

In one subembodiment, the uplink data to be transmitted is transmitted via an RB configured for SDT.

In one subembodiment, the uplink data to be transmitted is transmitted via a DRB or SRB configured for SDT.

In one subembodiment, the uplink data to be transmitted is transmitted via a Common Control Channel (CCCH).

In one embodiment, the first payload comprises one or multiple packages of higher layers.

In one subembodiment, a package of the higher layers comprises a PDCP Protocol Data Unit (PDU).

In one subembodiment, a package of the higher layers comprises a PDCP Service Data Unit (SDU).

In one subembodiment, a package of the higher layers comprises an RLC PDU.

In one subembodiment, a package of the higher layers comprises an RLC SDU.

In one subembodiment, a package of the higher layers comprises a Data Radio Bearer (DRB).

In one subembodiment, a package of the higher layers comprises a Signaling Radio Bearer (SRB).

In one embodiment, the first payload comprises a payload other than the first sub-payload.

In one embodiment, the first payload does not comprise a CCCH.

In one embodiment, the first payload does not comprise a DRB.

In one embodiment, the first payload does not comprise a BSR.

In one embodiment, the first payload does not comprise a CCCH or a Buffer Status Report (BSR).

In one embodiment, when the first payload comprises the first sub-payload, a first preamble resource group subset is determined out of the K1 preamble resource group(s) according to a size of the first payload.

In one embodiment, when the first payload does not comprise the first sub-payload, a first preamble resource group subset is determined out of the K1 preamble resource group(s) according to a size of the first payload.

In one embodiment, the first preamble resource group subset is pre-configured.

In one embodiment, the first preamble resource group subset is configured for the first node.

In one subembodiment, any preamble resource in the first preamble resource group subset is only allocated to the first node.

In one subembodiment, at least one preamble resource in the first preamble resource group is allocated to a node other than the first node.

In one embodiment, the first preamble resource group subset is configured for a specific logical channel.

In one subembodiment, any preamble resource in the first preamble resource group subset is allocated to the specific logical channel.

In one subembodiment, the specific logical channel is configured according to the first priority.

In one subembodiment, the specific logical channel includes a logical channel of which the first priority is greater than or is no less than the first given value, where the first priority includes Bj of a logical channel of the first sub-payload.

In one subembodiment, the specific logical channel includes a logical channel of which the first priority is less than or is no greater than the first given value, where the first priority includes a priority of a logical channel of the first sub-payload.

In one embodiment, the action of determining a first preamble resource group subset out of the K1 preamble resource group(s) according to a size of the first payload comprises that: the size of the first payload is a necessary condition for selecting the first preamble resource group subset from the K1 preamble resource group(s).

In one embodiment, the action of determining a first preamble resource group subset out of the K1 preamble resource group(s) according to a size of the first payload comprises that: the size of the first payload is used to determine that the first preamble resource group subset is selected from the K1 preamble resource group(s).

In one embodiment, the action of determining a first preamble resource group subset out of the K1 preamble resource group(s) according to a size of the first payload comprises that: determining a first preamble resource group subset out of the K1 preamble resource group(s) is related to a size of the first payload.

In one embodiment, the action of determining a first preamble resource group subset out of the K1 preamble resource group(s) according to a size of the first payload comprises that: a first preamble resource group subset is determined out of the K1 preamble resource group(s) according to the size of the first payload and a Pathloss (PL).

In one embodiment, the action of determining a first preamble resource group subset out of the K1 preamble resource group(s) according to a size of the first payload comprises that: a first preamble resource group subset is determined out of the K1 preamble resource group(s) according to the size of the first payload and a CE level.

In one embodiment, the action of determining a first preamble resource group subset out of the K1 preamble resource group(s) according to a size of the first payload comprises that: a first preamble resource group subset is determined out of the K1 preamble resource group(s) according to the size of the first payload and an RSRP.

In one embodiment, the phrase of selecting a first preamble resource in the first preamble resource group subset comprises: selecting the first preamble resource from preamble resources associated with the first preamble resource group subset.

In one embodiment, the phrase of selecting a first preamble resource in the first preamble resource group subset comprises: selecting the first preamble resource from all preamble groups in the first preamble resource group subset.

In one embodiment, the first message is transmitted via an air interface.

In one embodiment, the first message is transmitted via an antenna port.

In one embodiment, the first message is transmitted via a physical layer signal.

In one embodiment, the first message comprises an Uplink (UL) signal.

In one embodiment, the first message comprises a Sidelink (SL) signal.

In one embodiment, the first message is transmitted on a Physical Random Access Channel (PRACH).

In one embodiment, the first message comprises all or part of a Physical Layer Signal.

In one embodiment, the first message comprises a Message 1 (Msg1).

In one embodiment, the first message comprises all or part of a Message A (MsgA).

In one embodiment, the first message comprises information carried by a PRACH in the MsgA.

In one embodiment, the first message comprises a Preamble.

In one embodiment, the first message comprises a sequence.

In one subembodiment, the sequence comprises a first characteristic sequence.

In one subembodiment, the sequence comprises one or more of a pseudo-random sequence, a Zadoff-Chu sequence or a low-Peak-to-Average Power Ratio (low-PAPR) sequence.

In one subembodiment, the sequence comprises a Cyclic Prefix (CP).

In one subembodiment, the sequence comprises a positive integer.

In one subembodiment, the sequence comprises a bit string.

In one embodiment, the first message is related to the third message.

In one embodiment, the first message is unrelated to the third message.

In one embodiment, the first message and the third message are transmitted simultaneously.

In one embodiment, the first message and the third message are not transmitted simultaneously.

In one embodiment, the action of transmitting a third message on a first resource pool comprises: transmitting the third message through the first resource pool.

In one embodiment, the action of transmitting a third message on a first resource pool comprises: mapping the third message to the first resource pool and transmitting the third message.

In one embodiment, the action of transmitting a third message on a first resource pool comprises: the first resource pool being used for bearing the third message.

In one embodiment, as a response to the action of transmitting a third message on a first resource pool, receiving an MsgB.

In one embodiment, as a response to the action of transmitting a third message on a first resource pool, receiving an Msg4.

In one embodiment, the third message is a first uplink scheduling transmission in a random access procedure.

In one embodiment, the third message is a M1-th uplink scheduling transmission in a random access procedure, where M1 is a positive integer greater than 1.

In one embodiment, the second message is used for triggering the third message.

In one embodiment, the third message is transmitted via an air interface.

In one embodiment, the third message is transmitted via an antenna port.

In one embodiment, the third message is transmitted via a physical layer signal.

In one embodiment, the third message is used for a random access procedure.

In one embodiment, the third message comprises an Uplink (UL) signal.

In one embodiment, the third message comprises a Sidelink (SL) signal.

In one embodiment, the third message is transmitted on a Physical Uplink Shared Channel (PUSCH).

In one embodiment, the third message is transmitted through a CCCH.

In one embodiment, the third message is transmitted through a DRB.

In one embodiment, the third message is transmitted through an SRB.

In one embodiment, the third message comprises all or part of an RRC message.

In one embodiment, the third message comprises a PUSCH.

In one embodiment, the third message comprises an Msg3.

In one embodiment, the third message comprises part of an MsgA.

In one embodiment, the third message comprises an RRC message.

In one embodiment, the third message comprises DRB data in SDT.

In one embodiment, the third message comprises a RRCResumeRequest message or a RRCResumeRequest1 message or a RRCConnectionResumeRequest message.

In one embodiment, a name of the third message includes RRC.

In one subembodiment, a name of the third message includes at least one of small, or inactive, or early, or data, or resume, or request, or transmission.

In one subsidiary embodiment of the above subembodiment, the above words are case-insensitive.

In one subsidiary embodiment of the above subembodiment, the above words have initials in capitals.

In one subsidiary embodiment of the above subembodiment, the above words are all written in capitals/uppercase.

In one subsidiary embodiment of the above subembodiment, the above words are all written in lowercase.

In one embodiment, the third message comprises a RRCEarlyDataRequest message.

In one embodiment, the third message comprises a RRCSmallDataRequest message.

In one embodiment, the third message comprises a RRCInactiveDataRequest message.

In one embodiment, a Signaling Radio Bearer (SRB) for the third message includes SRB0.

In one embodiment, the third message comprises a CCCH message.

In one embodiment, the third message comprises DRB data.

In one embodiment, the third message comprises a MAC CE.

In one embodiment, the third message comprises a MAC SDU.

In one embodiment, the third message comprises a Buffer Status Report (BSR).

In one embodiment, the third message comprises Padding bits.

In one embodiment, resources occupied by the first resource pool are pre-defined.

In one embodiment, resources occupied by the first resource pool are dynamically scheduled.

In one embodiment, the first resource pool comprises a UL grant.

In one embodiment, the first resource pool comprises an uplink resource block.

In one embodiment, the first resource pool comprises Physical Resource Block (PRB) resources.

In one embodiment, the first resource pool comprises physical resources used for uplink transmission.

In one embodiment, the first resource pool comprises PUSCH resources.

In one embodiment, the first resource pool comprises PUCCH resources.

In one embodiment, the first resource pool comprises PRACH resources.

In one embodiment, the second message indicates the first resource pool.

In one subembodiment, the phrase that the second message indicates the first resource pool comprises that: the second message is used to determine the first resource pool.

In one subembodiment, the phrase that the second message indicates the first resource pool comprises that: the second message explicitly indicates the first resource pool.

In one subembodiment, the phrase that the second message indicates the first resource pool comprises that: the second message implicitly indicates the first resource pool.

In one subembodiment, the first message comprises a Message 1 (Msg1).

In one subembodiment, the first message comprises part of a Message A (MsgA).

In one subembodiment, the second message comprises a Message 2 (Msg2), the Msg2 comprising a Random Access Response (RAR).

In one subembodiment, the second message comprises a Message B (MsgB), the MsgB comprising a fallbackRAR.

In one subembodiment, the third message comprises a Message 3 (Msg3).

In one subembodiment, the third message comprises part of an MsgA.

In one embodiment, the first preamble resource indicates the first resource pool.

In one subembodiment, the phrase that the first preamble resource indicates the first resource pool comprises that: the first preamble resource is used to determine the first resource pool.

In one subembodiment, the phrase that the first preamble resource indicates the first resource pool comprises that: the first preamble resource is associated with the first resource pool.

In one subembodiment, the first message comprises part of an MsgA.

In one subembodiment, the third message comprises part of an MsgA.

In one subembodiment, the MsgA comprises the first message and the third message.

In one subembodiment, the second message comprises all or part of an MsgB.

In one subembodiment, the second message comprises at least one of a fallbackRAR, or a successRAR, or a Backoff indication, or a MAC SDU of a CCCH or a DCCH, or a padding bit or a MAC subheader.

In one embodiment, as a response to the action of transmitting a first message comprises: when the first message is transmitted.

In one embodiment, as a response to the action of transmitting a first message comprises: an action within a certain time interval after the first message is transmitted.

In one embodiment, the second message is transmitted via an air interface.

In one embodiment, the second message is transmitted via an antenna port.

In one embodiment, the second message is used for a random access procedure.

In one embodiment, the second message comprises all or part of a Physical Layer Signal.

In one embodiment, the second message comprises all or part of a MAC layer signaling.

In one embodiment, the second message comprises a physical-layer signaling.

In one embodiment, the second message comprises a Physical Downlink Control Channel (PDCCH).

In one embodiment, the second message comprises a Sidelink (SL) signal.

In one embodiment, the second message comprises a Downlink (DL) signal.

In one embodiment, the second message comprises all or part of a MAC layer signaling.

In one embodiment, the second message comprises Downlink Control Information (DCI).

In one embodiment, the second message comprises an Msg2.

In one embodiment, the second message comprises all or part of an MsgB.

In one subembodiment, the MsgB comprises a RRCRelease message or a RRCConnectionRelease message.

In one subembodiment, the MsgB comprises a RRCConnectionDataComplete message.

In one subembodiment, the MsgB comprises a RRCEarlyDataComplete message.

In one subembodiment, the MsgB comprises a RRCSmallDataComplete message.

In one subembodiment, the MsgB comprises a RRCInactiveDataComplete message.

In one subembodiment, the MsgB comprises an RRC message, where a name of the RRC message includes at least one of RRC, or Complete, or early, or small, or inactive, or data, or idt, or sdt.

In one subsidiary embodiment of the above subembodiment, the above words are case-insensitive.

In one subsidiary embodiment of the above subembodiment, the above words have initials in capitals.

In one subsidiary embodiment of the above subembodiment, the above words are all written in capitals/uppercase.

In one subsidiary embodiment of the above subembodiment, the above words are all written in lowercase.

In one subembodiment, the MsgB comprises a UE Contention Resolution Identity.

In one subembodiment, the MsgB comprises a CCCH message.

In one subembodiment, the MsgB comprises a UL Grant.

In one subembodiment, the MsgB comprises a PDCCH.

In one subembodiment, the MsgB comprises a DCI.

In one subembodiment, the MsgB is identified by a C-RNTI.

In one subembodiment, a Cyclic Redundancy Check (CRC) of the MsgB is scrambled by a C-RNTI or a MCS (i.e., abbreviation for Modulation and Coding Scheme)-C-RNTI.

In one subembodiment, a CRC of the MsgB is scrambled by a Temporary C-RNTI.

In one subembodiment, a CRC of the MsgB is scrambled by a C-RNTI.

In one subembodiment, a CRC of the MsgB is scrambled by a MsgB-RNTI.

In one subembodiment, a CRC of the MsgB is scrambled by a Random Access (RA)-RNTI.

In one subembodiment, a CRC of the MsgB is scrambled by the first RNTI.

In one subembodiment, the MsgB comprises one or more fields in an RRC message.

In one subsidiary embodiment of the above subembodiment, a name of the field includes fullI-RNTI.

In one subsidiary embodiment of the above subembodiment, a name of the field includes at least one of shortI-RNTIs.

In one subsidiary embodiment of the above subembodiment, a name of the field includes ran-PagingCycle.

In one subsidiary embodiment of the above subembodiment, a name of the field includes ran-NotificationAreaInfo.

In one subsidiary embodiment of the above subembodiment, a name of the field includes t380.

In one subsidiary embodiment of the above subembodiment, a name of the field includes nextHopChainingCount.

In one subsidiary embodiment of the above subembodiment, a name of the field includes C-RNTI.

In one subsidiary embodiment of the above subembodiment, a name of the field includes drb-ContinueROHC.

In one subsidiary embodiment of the above subembodiment, a name of the field includes measInactiveConfig.

In one subsidiary embodiment of the above subembodiment, a name of the field includes measIdleConfig.

In one subsidiary embodiment of the above subembodiment, a name of the field includes rrc-InactiveConfig.

In one subsidiary embodiment of the above subembodiment, a name of the field includes cg-Config.

In one subsidiary embodiment of the above subembodiment, a name of the field includes pur-Config.

In one subsidiary embodiment of the above subembodiment, the field indicates the first expiration value of the first timer.

In one subsidiary embodiment of the above subembodiment, the field indicates configurations of the first data radio bearer.

In one subsidiary embodiment of the above subembodiment, the field indicates ROHC of the first data radio bearer.

In one embodiment, the second message is triggered by the first message.

In one embodiment, the second message is used for an acknowledgement for the first message.

In one embodiment, the second message comprises a MAC PDU.

In one embodiment, the second message comprises a MAC SDU.

In one embodiment, the second message comprises a MAC CE.

In one embodiment, the second message comprises a MAC subheader.

In one embodiment, the second message comprises a MAC PDU, the MAC PDU comprising a Timing Advance (TA).

In one embodiment, the second message comprises a MAC PDU, the MAC PDU comprising a UL Grant.

In one embodiment, the second message comprises a MAC PDU, the MAC PDU comprising a Temporary C-RNTI (TC-RNTI).

In one embodiment, the second message comprises a MAC PDU, the MAC PDU comprising an RAR.

In one embodiment, the second message comprises a MAC PDU, the MAC PDU comprising a fallbackRAR.

In one embodiment, the second message comprises a MAC PDU, the MAC PDU comprising a successRAR.

In one subembodiment, the successRAR does not comprise a UL grant.

In one subembodiment, the successRAR comprises a UL grant.

In one embodiment, the second message comprises a field in a MAC PDU, the field comprising a UL grant.

In one embodiment, the second message comprises a field in a MAC PDU, the field comprising a PUCCH Resource Indicator.

In one embodiment, the second message comprises a field in a MAC PDU, the field comprising a PUSCH Resource Indicator.

In one embodiment, the second message comprises a field in a MAC PDU, the field being used to indicate the first resource pool.

In one embodiment, a total number of preamble resources comprised by the K1 preamble resource group(s) is a fixed value.

In one embodiment, a total number of preamble resources comprised by the K1 preamble resource group(s) is configurable.

In one embodiment, a total number of preamble resources comprised by the K1 preamble resource group(s) is pre-configured.

In one embodiment, a total number of preamble resources comprised by the K1 preamble resource group(s) is 64.

In one embodiment, a total number of preamble resources comprised by the K1 preamble resource group(s) is 128.

In one embodiment, K1 is equal to 2.

In one embodiment, K1 is greater than 2.

In one embodiment, K1 is no greater than 64.

In one embodiment, K1 is no greater than 128.

In one embodiment, K1 is no greater than 10240.

In one embodiment, the phrase that each preamble resource group of the K1 preamble resource group(s) comprises at least one preamble resource comprises that: each preamble resource group of the K1 preamble resource group(s) consists of one or multiple preamble resources.

In one embodiment, the phrase that each preamble resource group of the K1 preamble resource group(s) comprises at least one preamble resource comprises that: numbers of preamble resources comprised respectively by any two preamble resource groups among the K1 preamble resource groups are equal.

In one embodiment, the phrase that each preamble resource group of the K1 preamble resource group(s) comprises at least one preamble resource comprises that: numbers of preamble resources comprised respectively by any two preamble resource groups among the K1 preamble resource groups are unequal.

In one embodiment, the phrase that each preamble resource in the K1 preamble resource group(s) is used for a random access procedure comprises that: each preamble resource in the K1 preamble resource group(s) is transmitted by means of a PRACH resource.

In one embodiment, the phrase that each preamble resource in the K1 preamble resource group(s) is used for a random access procedure comprises that: each preamble resource in the K1 preamble resource group(s) is reserved for a random access preamble.

In one embodiment, the phrase that each preamble resource in the K1 preamble resource group(s) is used for a random access procedure comprises that: each preamble resource in the K1 preamble resource group(s) is reserved for an MsgA preamble.

In one embodiment, the phrase that each preamble resource in the K1 preamble resource group(s) is used for a random access procedure comprises that: each preamble resource in the K1 preamble resource group(s) is reserved for an Msg1 preamble.

In one embodiment, the phrase that each preamble resource in the K1 preamble resource group(s) is used for a random access procedure comprises that: any preamble resource in the K1 preamble resource group(s) is reserved for one of an MsgA preamble or an Msg1 preamble.

In one embodiment, the phrase that the first preamble resource group subset comprises at least one preamble resource group comprises that: the first preamble resource group subset consists of one or multiple preamble resource groups.

In one embodiment, the phrase that the first preamble resource group subset comprises at least one preamble resource group comprises that: the first preamble resource group subset comprises K2 preamble resource group(s), K2 being a positive integer no greater than K1.

In one subembodiment, K2 is equal to 1.

In one subembodiment, K2 is greater than 1.

In one embodiment, the K1 preamble resource group(s) is(are) associated with N1 preamble resource group subset(s), N1 being a positive integer no greater than K1.

In one subembodiment, K1 is equal to N1.

In one subsidiary embodiment of the above subembodiment, a preamble resource group subset refers to a preamble resource group.

In one subsidiary embodiment of the above subembodiment, each of the N1 preamble resource group subset(s) only comprises one preamble resource group.

In one subembodiment, K1 is greater than N1.

In one subsidiary embodiment of the above subembodiment, at least one of the N1 preamble resource group subset(s) comprises more than one preamble resource group.

In one subsidiary embodiment of the above subembodiment, there are two preamble resource group subsets among the N1 preamble resource group subsets that have equal numbers of preamble resource groups.

In one subsidiary embodiment of the above subembodiment, there are two preamble resource group subsets among the N1 preamble resource group subsets that have unequal numbers of preamble resource groups.

In one subsidiary embodiment of the above subembodiment, numbers of preamble resource groups comprised in any two preamble resource group subsets among the N1 preamble resource group subsets are identical.

In one subsidiary embodiment of the above subembodiment, numbers of preamble resource groups comprised in any two preamble resource group subsets among the N1 preamble resource group subsets are different.

In one embodiment, there is at least one preamble resource group of the K1 preamble resource group(s) that does not belong to the first preamble resource group subset.

In one embodiment, a number of preamble resource group(s) comprised by the first preamble resource group subset is unrelated to the size of the first payload.

In one embodiment, the size of the first payload is used to determine a number of preamble resource group(s) comprised by the first preamble resource group subset.

In one embodiment, the number of preamble resource groups comprised by the first preamble resource group subset is greater than 1 and less than K1, where K1 is greater than 2.

In one embodiment, the phrase that the first preamble resource group subset comprises at least one preamble resource group comprises that: the first preamble resource group subset comprises one preamble resource group.

In one subembodiment, the first preamble resource group subset is a preamble resource group.

In one embodiment, the phrase that the first preamble resource group subset comprises at least one preamble resource group comprises that: the first preamble resource group subset comprises multiple preamble resource groups.

In one embodiment, the phrase that the first message is associated with the first preamble resource comprises: the first message being transmitted based on the first preamble resource.

In one embodiment, the phrase that the first message is associated with the first preamble resource comprises: the first message being transmitted on the first preamble resource.

In one embodiment, the phrase that the first message is associated with the first preamble resource comprises: resources occupied by the first message being related to the first preamble resource.

In one embodiment, the phrase that the first message is associated with the first preamble resource comprises: the first message comprises the first preamble resource.

In one embodiment, the first payload comprises the first sub-payload.

In one embodiment, the first payload does not comprise the first sub-payload.

In one embodiment, the phrase that a first condition set is used to determine whether the first payload comprises a first sub-payload comprises: whether the first payload comprises the first sub-payload being related to the first condition set.

In one embodiment, the phrase that a first condition set is used to determine whether the first payload comprises a first sub-payload comprises: determining whether the first payload comprises the first sub-payload according to whether the first condition set is being satisfied.

In one subembodiment, when the first condition set is satisfied, the first payload does not comprise the first sub-payload.

In one subembodiment, when the first condition set is unsatisfied, the first payload comprises the first sub-payload.

In one subembodiment, when the first condition set is satisfied, the first payload comprises the first sub-payload.

In one subembodiment, when the first condition set is unsatisfied, the first payload does not comprise the first sub-payload.

In one embodiment, the first sub-payload is a payload corresponding to a given logical channel.

In one subembodiment, the given logical channel comprises a logical channel corresponding to a DRB used for the RA-based SDT.

In one subembodiment, the given logical channel comprises a logical channel corresponding to a BSR.

In one subembodiment, the given logical channel comprises a logical channel corresponding to a CCCH.

In one subembodiment, the given logical channel comprises a logical channel corresponding to a C-RNTI MAC CE.

In one subembodiment, the given logical channel comprises a logical channel corresponding to a MAC subheader.

In one embodiment, the phrase of the first sub-payload not being rejected by the first resource pool comprises that: data in a radio bearer to which the first sub-payload belongs can be transmitted in the first resource pool.

In one embodiment, the phrase of the first sub-payload not being rejected by the first resource pool comprises that: the first resource pool can only be used for transmitting data of a first logical channel Identity (ID) set, where a logical channel ID of the first sub-payload belongs to the first logical channel ID set.

In one embodiment, the phrase of the first sub-payload not being rejected by the first resource pool comprises that: the first resource pool is used for transmitting data of a first logical channel Identity (ID) set, where a logical channel ID of the first sub-payload belongs to the first logical channel ID set.

In one subembodiment, when the data of the first logical channel ID set is assigned with resources and there exist remaining resources, the remaining resources are allocated to a logical channel ID of the first sub-payload.

In one subembodiment, when a priority of the first sub-payload is higher than that of the data of the first logical channel ID set, the first sub-payload is transmitted in the first resource pool.

In one embodiment, the phrase of the first sub-payload not being rejected by the first resource pool comprises that: the first resource pool can only be used for transmitting SDT-related data, where a logical channel ID of the first sub-payload belongs to all of the SDT-related data.

In one embodiment, the phrase of the first sub-payload not being rejected by the first resource pool comprises that: the first resource pool can only be used for transmitting SDT-related data, where a logical channel ID of the first sub-payload belongs to part of the SDT-related data.

In one embodiment, the phrase of the first sub-payload not being rejected by the first resource pool comprises that: when each payload higher than the first priority is assigned with resources and there exist idle resources in the first resource pool, the first sub-payload is transmitted in the first resource pool.

In one embodiment, the phrase of a first sub-payload corresponds to a logical channel ID, the logical channel ID being any logical channel ID in the first logical channel ID set.

In one embodiment, the phrase of the first sub-payload not being rejected by the first resource pool comprises that: the first resource pool can transmit the first sub-payload.

In one embodiment, the phrase that the first condition set is related to a logical channel comprises that: one or more of conditions in the first condition set are related to the logical channel.

In one embodiment, the phrase that the first condition set is related to a logical channel comprises that: the first condition set is related to a type of the logical channel.

In one embodiment, the phrase that the first condition set is related to a logical channel comprises that: the first condition set is related to a priority of the logical channel.

In one embodiment, the phrase that the first condition set is related to a logical channel comprises that: the first condition set is related to a state of the logical channel.

In one embodiment, the phrase that the third message carries all or part of the first payload comprises that: the third message comprises all information in the first payload.

In one embodiment, the phrase that the third message carries all or part of the first payload comprises that: the third message comprises partial information in the first payload.

In one embodiment, it is determined according to a priority of the logical channel that the third message carries all or part of the first payload.

In one embodiment, it is determined according to the first priority that the third message carries all or part of the first payload.

In one embodiment, it is determined according to the first indication that the third message carries all or part of the first payload.

In one embodiment, the phrase that a size of the first resource pool is related to the first preamble resource group subset comprises that: the first preamble resource group subset is used to determine a range of size of the first resource pool.

In one embodiment, the phrase that a size of the first resource pool is related to the first preamble resource group subset comprises that: the first preamble resource group subset is used to determine a maximum value of size of the first resource pool.

In one embodiment, the phrase that a size of the first resource pool is related to the first preamble resource group subset comprises that: the first preamble resource group subset is used to determine a maximum value and a minimum value of size of the first resource pool.

In one embodiment, the phrase that a size of the first resource pool is related to the first preamble resource group subset comprises that: the first preamble resource group subset is associated with the first resource pool.

In one embodiment, the phrase that a size of the first resource pool is related to the first preamble resource group subset comprises that: the first preamble resource group subset is indexed to the first resource pool.

Embodiment 2

Embodiment 2 illustrates a schematic diagram of a network architecture according to one embodiment of the present application, as shown in FIG. 2. FIG. 2 is a diagram illustrating a network architecture 200 of 5G New Radio (NR), Long-Term Evolution (LTE) and Long-Term Evolution Advanced (LTE-A) systems. The 5G NR or LIE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 is a UE.

In one embodiment, the gNB203 corresponds to the second node in the present application.

In one embodiment, the gNB203 is a BaseStation (BS).

In one embodiment, the gNB203 is a UE.

In one embodiment, the gNB203 is a relay.

In one embodiment, the gNB203 is a Gateway.

In one embodiment, the UE supports transmissions in Non-Terrestrial Network (NTN).

In one embodiment, the UE supports transmissions in Terrestrial Network (TN).

In one embodiment, the UE supports transmissions in large-delay-difference networks.

In one embodiment, the UE supports Dual Connection (DC) transmissions.

In one embodiment, the UE comprises an aircraft.

In one embodiment, the UE comprises a vehicle-mounted terminal.

In one embodiment, the UE comprises a vessel.

In one embodiment, the UE comprises an Internet-of-Things (IoT) terminal.

In one embodiment, the UE comprises an Industrial IoT (IIoT) terminal.

In one embodiment, the UE comprises a piece of equipment supporting transmissions with low delay and high reliability.

In one embodiment, the UE comprises test equipment.

In one embodiment, the UE comprises a signaling test instrument.

In one embodiment, the base station supports transmissions in NTN.

In one embodiment, the base station supports transmissions in large-delay-difference networks.

In one embodiment, the base station supports transmissions in TN.

In one embodiment, the base station comprises a Macro-Cellular base station.

In one embodiment, the base station comprises a Micro Cell base station.

In one embodiment, the base station comprises a Pico Cell base station.

In one embodiment, the base station comprises a Femto-cell.

In one embodiment, the base station comprises abase station device supporting large time-delay difference.

In one embodiment, the base station comprises a flight platform.

In one embodiment, the base station comprises satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling test instrument.

In one embodiment, the base station comprises an Integrated Access and Backhaul-node (IAB-node).

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises a L3 relay.

In one embodiment, the relay comprises a L2 relay.

In one embodiment, the relay comprises a Router.

In one embodiment, the relay comprises an Exchanger.

In one embodiment, the relay comprises a UE.

In one embodiment, the relay comprises a base station.

Embodiment 3

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, which comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell, as well as for HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306.

In one embodiment, the first signaling in the present application is generated by the PDCP304 or the PDCP354.

In one embodiment, the first signaling in the present application is generated by the MAC302 or the MAC352.

In one embodiment, the first signaling in the present application is generated by the PHY301 or the PHY351.

In one embodiment, the first message in the present application is generated by the PHY301 or the PHY351.

In one embodiment, the second message in the present application is generated by the RRC306.

In one embodiment, the second message in the present application is generated by the PDCP304 or the PDCP354.

In one embodiment, the second message in the present application is generated by the MAC302 or the MAC352.

In one embodiment, the second message in the present application is generated by the PHY301 or the PHY351.

In one embodiment, the third message in the present application is generated by the RRC306.

In one embodiment, the third message in the present application is generated by the PDCP304 or the PDCP354.

In one embodiment, the third message in the present application is generated by the MAC302 or the MAC352.

In one embodiment, the third message in the present application is generated by the PHY301 or the PHY351.

In one embodiment, the fourth message in the present application is generated by the RRC306.

In one embodiment, the fourth message in the present application is generated by the PDCP304 or the PDCP354.

In one embodiment, the fourth message in the present application is generated by the MAC302 or the MAC352.

In one embodiment, the fourth message in the present application is generated by the PHY301 or the PHY351.

Embodiment 4

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor, the first communication device 450 at least: receives a first signaling, the first signaling being used to determine K1 preamble resource group(s); determines a first payload; determines a first preamble resource group subset out of the K1 preamble resource group(s) according to a size of the first payload; selects a first preamble resource in the first preamble resource group subset, and transmits a first message; receives a second message as a response to the action of transmitting a first message; and transmits a third message on a first resource pool; herein, each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, the first communication node 450 comprises a memory that stores a computer readable instruction program, the computer readable instruction program generates actions when executed by at least one processor, which include: receiving a first signaling, the first signaling being used to determine K1 preamble resource group(s); determining a first payload; determining a first preamble resource group subset out of the K1 preamble resource group(s) according to a size of the first payload; selecting a first preamble resource in the first preamble resource group subset, and transmitting a first message; receiving a second message as a response to the action of transmitting a first message; and transmitting a third message on a first resource pool; herein, each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used to determine K1 preamble resource group(s); receives a first message; transmits a second message as a response to the action of receiving a first message; receives a third message on a first resource pool; herein, a first payload is determined; a first preamble resource group subset is determined out of the K1 preamble resource group(s) according to a size of the first payload, and a first preamble resource is selected from the first preamble resource group subset; each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, the second communication node 410 comprises a memory that stores a computer readable instruction program, the computer readable instruction program generates actions when executed by at least one processor, which include: transmitting a first signaling, the first signaling being used to determine K1 preamble resource group(s); receiving a first message; transmitting a second message as a response to the action of receiving a first message; receiving a third message on a first resource pool; herein, a first payload is determined; a first preamble resource group subset is determined out of the K1 preamble resource group(s) according to a size of the first payload, and a first preamble resource is selected from the first preamble resource group subset; each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, the antenna 452, the receiver 454, the receiving processor 456, and the controller/processor 459 are used for receiving a first signaling; at least one of the antenna 420, the transmitter 418, the transmitting processor 416 or the controller/processor 475 is used for transmitting a first signaling.

In one embodiment, the antenna 452, the transmitter 454, the transmitting processor 468 and the controller/processor 459 are used for transmitting a first message; at least one of the antenna 420, the receiver 418, the receiving processor 470 or the controller/processor 475 is used for receiving a first message.

In one embodiment, the antenna 452, the receiver 454, the receiving processor 456, and the controller/processor 459 are used for receiving a second message; at least one of the antenna 420, the transmitter 418, the transmitting processor 416 or the controller/processor 475 is used for transmitting a second message.

In one embodiment, the antenna 452, the transmitter 454, the transmitting processor 468 and the controller/processor 459 are used for transmitting a third message; at least one of the antenna 420, the receiver 418, the receiving processor 470 or the controller/processor 475 is used for receiving a third message.

In one embodiment, the antenna 452, the transmitter 454, the transmitting processor 468 and the controller/processor 459 are used for transmitting a fourth message; at least one of the antenna 420, the receiver 418, the receiving processor 470 or the controller/processor 475 is used for receiving a fourth message.

In one embodiment, the first communication device 450 corresponds to the first node in the present application.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 corresponds to the second node in the present application.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5

Figure 5:
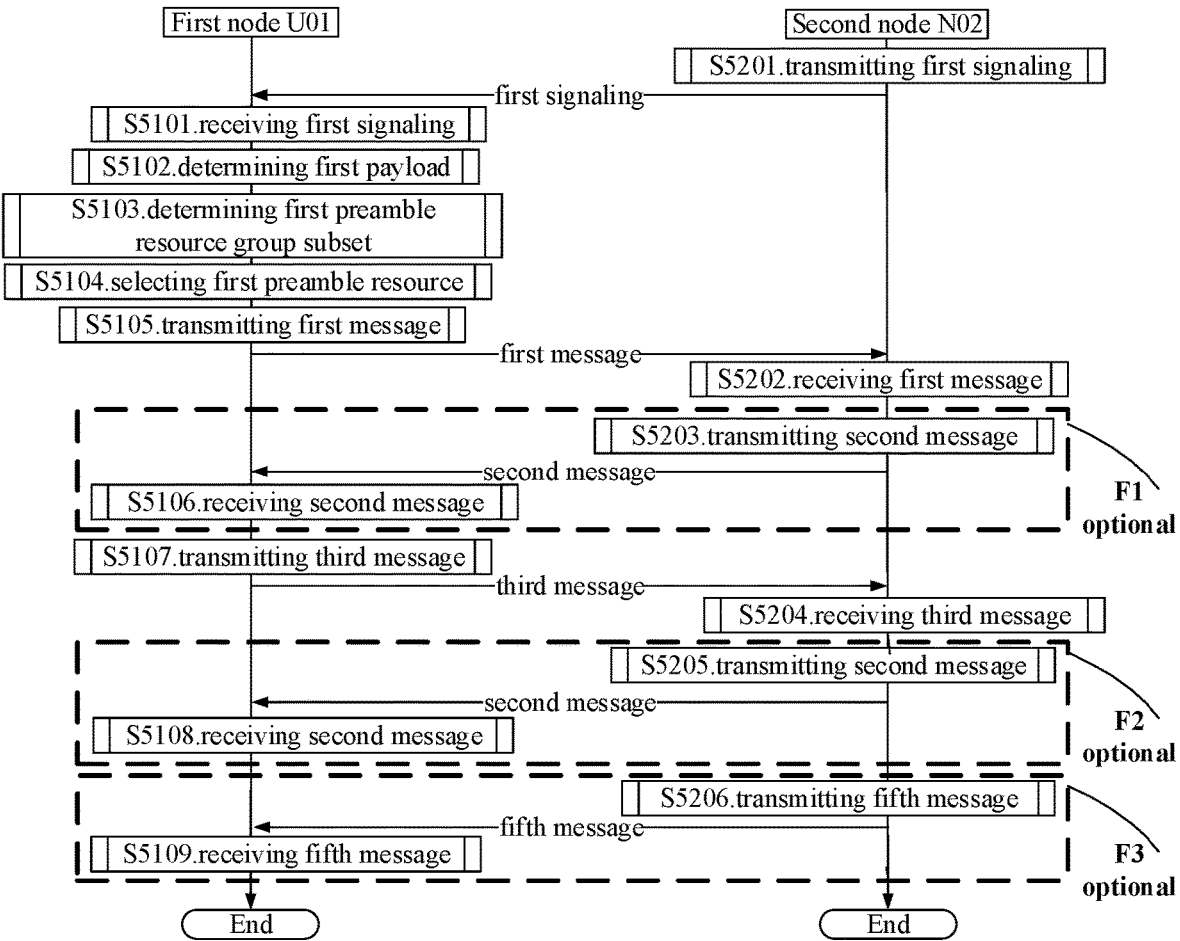
FIG. 5 illustrates a flowchart of radio signal transmission according to one embodiment of the present application.

Embodiment 5 illustrates a flowchart of radio signal transmission according to one embodiment of the present application, as shown in FIG. 5. It should be particularly noted that the sequence illustrated herein does not set any limit to the signal transmission order or implementation order in the present application.

The first node U01 receives a first signaling in step S5101; and determines a first payload in step S5102; determines a first preamble resource group subset out of the K1 preamble resource group(s) according to a size of the first payload in step S5103; selects a first preamble resource from the first preamble resource group subset in step S5104; transmits a first message in step S5105; and in step S5106, as a response to the action of transmitting a first message, receives a second message; and in step S107, transmits a third message on a first resource pool; and in step S5108, as a response to the action of transmitting a first message, receives a second message; and in step S5109, receives a fifth message as a response to the action of transmitting a third message on a first resource pool.

The second node N02 transmits a first signaling in step S5201; receives a first message in step S5202; transmits a second message in step S5203; receives a third message in step S5204; transmits a second message in step S5205; and transmits the fifth message in step S5206.

In Embodiment 5, the first signaling is used to determine K1 preamble resource group(s); each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset; the third message comprises a buffer status report (BSR), while the fifth message indicates a third resource pool.

In one embodiment, receiving the second message is before transmitting the third message.

In one embodiment, receiving the second message is after transmitting the third message.

In one embodiment, the first node U01 receives a first signaling, the first signaling being used to determine K1 preamble resource group(s); determines a first payload; determines a first preamble resource group subset out of the K1 preamble resource group(s) according to a size of the first payload; selects a first preamble resource in the first preamble resource group subset, and transmits the first message; receives a second message as a response to the action of transmitting a first message; and transmits a third message on a first resource pool.

In one subembodiment, the first message comprises an Msg1, the second message comprises an Msg2, and the third message comprises an Msg3.

In one subembodiment, the first message comprises an MsgA, the second message comprises an MsgB, and the third message comprises an Msg3.

In one embodiment, the first node U01 receives a first signaling, the first signaling being used to determine K1 preamble resource group(s); determines a first payload; determines a first preamble resource group subset out of the K1 preamble resource group(s) according to a size of the first payload; selects a first preamble resource in the first preamble resource group subset, and transmits the first message; transmits a third message on a first resource pool; and receives a second message as a response to the action of transmitting a first message.

In one subembodiment, the first message comprises part of an MsgA, the second message comprises all or part of an MsgB, and the third message comprises part of an MsgA.

In one subembodiment, the first message comprises a PRACH in an MsgA, the second message comprises all or part of an MsgB, and the third message comprises a PUSCH in an MsgA.

In one embodiment, the phrase that the third message comprises a buffer status report comprises that: the buffer status report is a field in the third message.

In one embodiment, the phrase that the third message comprises a buffer status report comprises that: the ordering of priority of a MAC CE of the buffer status report is higher than that of data of a DRB used for SDT.

In one embodiment, the buffer status report comprises a BSR.

In one embodiment, the buffer status report comprises a BSR other than any BSR carrying padding bits.

In one embodiment, the buffer status report comprises a MAC CE.

In one embodiment, the buffer status report comprises a byte.

In one embodiment, the buffer status report comprises Q1 bit(s), where Q1 is one of 1, 2, 3, 4, 5, 6, or 7.

In one embodiment, the buffer status report comprises a Logical Channel Group ID (LCG ID).

In one embodiment, the buffer status report does not comprise the LCG ID.

In one embodiment, the buffer status report only indicates data volume in a logical channel of a DRB for SDT.

In one embodiment, the buffer status report indicates data volume in a Logical Channel Group.

In one embodiment, when the cause of triggering the random access procedure includes starting a RA-based SDT, the buffer status report cannot be canceled.

In one embodiment, when the cause of triggering the random access procedure includes starting a RA-based SDT, the third message carries the buffer status report.

In one embodiment, the phrase that the fifth message indicates a third resource pool comprises that: the fifth message comprises a field, the field indicating the third resource pool.

In one embodiment, the phrase that the fifth message indicates a third resource pool comprises that: the fifth message is used to determine the third resource pool.

In one embodiment, the third resource pool is used for transmitting data of a logical channel of a DRB used for SDT.

In one embodiment, the third resource pool is used for transmitting remaining data in the first payload transmitted through the first resource pool.

In one embodiment, the fifth message comprises a physical-layer signaling.

In one embodiment, the fifth message comprises a PDCCH.

In one embodiment, the fifth message comprises a DCI.

In one embodiment, the fifth message comprises a MAC CE.

In one embodiment, the fifth message comprises a MAC PDU.

In one embodiment, the fifth message comprises a MAC subheader.

In one embodiment, the fifth message comprises a Message 4 (Msg4).

In one embodiment, the fifth message comprises part of an MsgB.

In one embodiment, the fifth message comprises a field in an MsgB.

In one embodiment, the fifth message comprises a field in the Msg4.

In one embodiment, the fifth message and the second message are fields in a same MAC sub-PDU.

In one embodiment, the fifth message is a field in the second message.

In one embodiment, the fifth message comprises a field in a MAC CE, the field comprising a PUCCH Resource Indicator field.

In one embodiment, the fifth message comprises a field in a MAC CE, the field comprising a PUSCH Resource Indicator field.

In one embodiment, the fifth message comprises a field in a MAC CE, the field comprising a UL grant field.

In one embodiment, the fifth message comprises a field in a MAC CE, the field comprising a UE Contention Resolution Identity field.

In one embodiment, the fifth message comprises a field in a MAC CE, the field comprising a HARQ Feedback Timing Indicator field.

In one embodiment, the fifth message comprises a field in a MAC CE, the field comprising a C-RNTI field.

In one embodiment, the fifth message comprises a field in a MAC CE, the field comprising a TPC field.

In one embodiment, the fifth message comprises a field in a MAC CE, the field comprising a ChannelAccess-CPext field.

In one embodiment, the fifth message comprises a field in a MAC CE, the field comprising an R field.

In one embodiment, the dotted-line box F1 is optional.

In one embodiment, the dotted-line box F2 is optional.

In one embodiment, the dotted-line box F3 is optional.

In one embodiment, the dotted-line box F1 and the dotted-line box F2 do not co-exist.

In one subembodiment, the dotted-line box F1 exists, while the dotted-line box F2 does not exist.

In one subembodiment, the dotted-line box F1 does not exist, while the dotted-line box F2 exists.

In one embodiment, the dotted-line box F3 exists.

In one embodiment, the dotted-line box F3 does not exist.

Embodiment 6

Embodiment 6 illustrates a flowchart of signal transmission according to another embodiment of the present application, as shown in FIG. 6. It should be particularly noted that the sequence illustrated herein does not set any limit to the signal transmission order or implementation order in the present application.

The first node U01 receives a first signaling in step S6101; and determines a second payload in step S6102; transmits a fourth message on a second resource pool in step S6103; receives a first indication in step S6104; and determines a first payload in step S6105; determines a first preamble resource group subset out of the K1 preamble resource group(s) according to a size of the first payload in step S6106; selects a first preamble resource from the first preamble resource group subset in step S6107; and in step S6108, as a response to the action of transmitting a first message, receives a second message; transmits a third message in step S6109; and in step S6110, as a response to the action of transmitting a first message, receives a second message.

The second node N02 transmits a first signaling in step S6201; receives a fourth message in step S6202; transmits a second message in step S6203; receives a third message in step S6204; and transmits a second message in step S6205.

In Embodiment 6, the first signaling is used to determine K1 preamble resource group(s); each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset; the fourth message carries all or part of the second payload; the first indication is used to determine a failure of transmitting the fourth message; the first condition set comprises the action of receiving a first indication; there is at least one identical sub-payload shared by the first payload and the second payload.

In one embodiment, the action of determining a second payload comprises Logical Channel Prioritization (LCP).

In one embodiment, the action of determining a second payload comprises MAC PDU Multiplexing and Assembly.

In one embodiment, the action of determining a second payload determines a MAC CE and a MAC SDU comprised by a MAC PDU.

In one embodiment, the action of determining a second payload occurs before the action of determining a first payload.

In one embodiment, the action of determining a second payload occurs after the action of determining a first payload.

In one embodiment, the second payload comprises a MAC PDU.

In one embodiment, the second payload comprises data in a MAC buffer.

In one embodiment, the second payload comprises a CCCH.

In one embodiment, the second payload comprises DRB data in SDT.

In one embodiment, the second payload comprises all data on logical channels.

In one embodiment, the second payload comprises a MAC PDU set up after being through LCP.

In one embodiment, the second payload comprises data in a MAC PDU.

In one embodiment, the second payload comprises data in sidelink.

In one embodiment, the second payload comprises the first sub-payload.

In one embodiment, when determining the second payload, a logical channel of the first node U01 comprises the first sub-payload.

In one embodiment, the first sub-payload is generated before determining the second payload.

In one embodiment, the second payload does not comprise the first sub-payload.

In one embodiment, when the fourth message is generated, any logical channel of the first node U01 does not comprise the first sub-payload.

In one embodiment, when determining the second payload, any logical channel of the first node U01 does not comprise the first sub-payload.

In one embodiment, the first sub-payload is generated after determining the second payload and before determining the first payload.

In one embodiment, when determining to perform SDT based on a second resource pool, the second payload is determined.

In one embodiment, the second resource pool is pre-configured.

In one embodiment, the second resource pool is used for an RRC Inactive state.

In one embodiment, the second resource pool comprises CG resources.

In one embodiment, the second resource pool is used for SDT.

In one embodiment, the second resource pool is configured for a DRB.

In one embodiment, the second resource pool is configured for a logical channel.

In one embodiment, the second resource pool is configured via an RRC message.

In one embodiment, the second resource pool is configured via an RRCRelease message.

In one embodiment, the second resource pool is configured via a RRCReconfiguration message.

In one embodiment, the second resource pool is configured via a SIB1 message.

In one embodiment, the second resource pool is configured in an RRC_CONNECTED state.

In one embodiment, the second resource pool is configured in an RRC_INACTIVE state.

In one embodiment, the second resource pool is configured in an RRC_IDLE state.

In one embodiment, when a first timer is running, transmit a fourth message on a second resource pool.

In one subembodiment, the first timer being running is used to determine that the second resource pool is valid.

In one subembodiment, the first timer being expired is used to determine that the second resource pool is invalid.

In one subembodiment, upon reception of a Timing Advance Command (TAC), the first timer is started or restarted.

In one subembodiment, upon reception of an Absolute Timing Advance Command, the first timer is started or restarted.

In one embodiment, the phrase that the fourth message carries all or part of the second payload comprises that: the second payload is one or multiple fields in the fourth message.

In one embodiment, the phrase that the fourth message carries all or part of the second payload comprises that: the second payload is all or part of the fourth message.

In one embodiment, the phrase that the fourth message carries all or part of the second payload comprises that: the fourth message carries all of the second payload.

In one embodiment, the phrase that the fourth message carries all or part of the second payload comprises that: the fourth message carries part of the second payload.

In one embodiment, the fourth message comprises a MAC PDU.

In one embodiment, the fourth message comprises a MAC CE.

In one embodiment, the fourth message comprises a MAC SDU.

In one embodiment, the fourth message comprises a MAC subheader.

In one embodiment, the fourth message comprises data in a MAC PDU.

In one embodiment, the fourth message comprises data in a MAC PDU set up after being through LCP.

In one embodiment, the fourth message only carries data on a logical channel associated with the second resource pool comprised in the second payload.

In one embodiment, the fourth message carries data on a logical channel associated with the second resource pool comprised in the second payload, and the fourth message carries data other than the data on the logical channel associated with the second resource pool comprised in the second payload.

In one embodiment, the fourth message carries data on a logical channel associated with the second resource pool comprised in the second payload, and the fourth message carries no data other than the data on the logical channel associated with the second resource pool comprised in the second payload.

In one embodiment, the fourth message comprises a last package in the second payload being transmitted through the second resource pool.

In one embodiment, the fourth message comprises any package in the second payload being transmitted through the second resource pool.

In one embodiment, data on a logical channel associated with the second resource pool comprised in the second payload is of a higher priority than a MAC CE related to the Sidelink (SL).

In one embodiment, it is determined according to the size of the second resource pool that the fourth message carries all or part of the second payload.

In one subembodiment, when the size of the second resource pool is no smaller than that of the second payload, the fourth message carries all of the second payload.

In one subembodiment, when the size of the second resource pool is smaller than that of the second payload, the fourth message carries part of the second payload.

In one embodiment, it is determined according to the size of the second resource pool and a priority of a logical channel associated with the second payload that the fourth message carries all of the second payload or part of the second payload.

In one embodiment, the first indication is used to determine a backoff to a RA-based SDT from a CG-based SDT.

In one embodiment, the first indication is used to determine a backoff to RA-based non-SDT from a RA-based SDT.

In one embodiment, the first indication is used to indicate a backoff to a 4-stepRA from a 2-stepRA.

In one embodiment, the first indication is used to indicate a backoff to a non-SDT from an SDT.

In one embodiment, the first indication includes a PUR fallback indication.

In one embodiment, the first indication is indicated to higher layers of the first node U01 by lower layers of the first node U01.

In one subembodiment, the lower layers include a PDCP layer.

In one subembodiment, the lower layers include an RLC layer.

In one subembodiment, the lower layers include a MAC layer.

In one subembodiment, the lower layers include a PHY layer.

In one subembodiment, the higher layers include an RRC layer.

In one subembodiment, the higher layers include a PDCP layer.

In one subembodiment, the higher layers include an RLC layer.

In one subembodiment, the higher layers include a MAC layer.

In one subembodiment, the higher layers are above the lower layers.

In one subembodiment, when a MAC layer receives the first indication from a PHY layer, the MAC layer indicates the first indication to the higher layers.

In one subembodiment, when an RLC layer receives the first indication from a MAC layer or a PHY layer, the RLC layer indicates the first indication to the higher layers.

In one subembodiment, when a PDCP layer receives the first indication from an RLC layer or a MAC layer or a PHY layer, the PDCP layer indicates the first indication to the higher layers.

In one embodiment, as a response to not having received an acknowledgement of the fourth message, transmit the first indication.

In one subembodiment, the phrase of not having received an acknowledgement of the fourth message comprises: a first timer being expired.

In one subembodiment, the phrase of not having received an acknowledgement of the fourth message comprises: not having received an ACK for the fourth message.

In one subembodiment, the phrase of not having received an acknowledgement of the fourth message comprises: not having received a PDCCH of an acknowledgement for the fourth message.

In one subembodiment, the phrase of not having received an acknowledgement of the fourth message comprises: not having received an acknowledgement of the fourth message in the PHY layer.

In one subembodiment, the phrase of not having received an acknowledgement of the fourth message comprises: not having received an acknowledgement of the fourth message in the MAC layer.

In one subembodiment, the phrase of not having received an acknowledgement of the fourth message comprises: not having received an acknowledgement of the fourth message in the RLC layer.

In one subembodiment, the phrase of not having received an acknowledgement of the fourth message comprises: not having received an acknowledgement of the fourth message in the PDCP layer.

In one subembodiment, the phrase of an acknowledgement of the fourth message comprises: a Layer 1 (L1) Acknowledgement (ACK).

In one subembodiment, the phrase of an acknowledgement of the fourth message comprises: a Hybrid Automatic Repeat Request (HARQ) ACK.

In one subembodiment, the phrase of an acknowledgement of the fourth message comprises: an RLC Status Report.

In one subembodiment, the phrase of an acknowledgement of the fourth message comprises: a PDCP Status Report.

In one embodiment, the phrase that the first condition set comprises the action of receiving a first indication comprises that: a reception of the first indication is a condition for satisfying the first condition set.

In one embodiment, the phrase that the first condition set comprises the action of receiving a first indication comprises that: when the first indication is received, a condition in the first condition set is satisfied.

In one embodiment, the phrase that the first condition set comprises the action of receiving a first indication comprises that: when the first indication is not received, the first condition set is unsatisfied.

In one embodiment, the phrase that there is at least one identical sub-payload shared by the first payload and the second payload comprises: the first payload and the second payload being the same.

In one embodiment, the phrase that there is at least one identical sub-payload shared by the first payload and the second payload comprises: the first payload and the second payload having at least one sub-payload in common.

In one embodiment, the phrase that there is at least one identical sub-payload shared by the first payload and the second payload comprises: there being at least one identical MAC SDU or MAC CE or MAC subheader shared by the first payload and the second payload.

In one embodiment, the first payload has one sub-payload different from the second payload.

In one embodiment, the first payload has one MAC SDU, or MAC CE or MAC subheader different from the second payload.

In one embodiment, during the time while a second timer is running, monitor a response to the fourth message.

In one subembodiment, the second timer includes a pur-ResponseWindowTimer.

In one subembodiment, the second timer is used to determine a maximum time interval for monitoring a response to the fourth message.

In one subembodiment, the second timer being expired is used to determine that transmitting the fourth message is failed.

In one subembodiment, upon reception of a response to the fourth message, stop the second timer.

In one subembodiment, when the second timer is expired, send the first indication to the higher layers.

In one embodiment, the dotted-line box F4 is optional.

In one embodiment, the dotted-line box F5 is optional.

In one embodiment, the dotted-line box F4 and the dotted-line box F5 do not co-exist.

In one subembodiment, the dotted-line box F4 exists, while the dotted-line box F5 does not exist.

In one subembodiment, the dotted-line box F4 does not exist, while the dotted-line box F5 exists.

Embodiment 7

Embodiment 7 illustrates a schematic diagram of whether a first condition set is satisfied being used to determine whether a first payload comprises a first sub-payload according to one embodiment of the present application.

In Embodiment 7, in step S701, determine whether a first condition set is satisfied, when the first condition set is satisfied, enter into step S702(*a*), or when the first condition set is unsatisfied, enter into step S702(*b*); in step S702(*a*), the first payload comprises the first sub-payload; in step S702(*b*), the first payload does not comprise the first sub-payload.

In one embodiment, at least one of the first priority, or the first indication or the cause of triggering the random access procedure is used to determine whether the first payload comprises a first sub-payload.

In one embodiment, the first condition set is related to a logical channel, or the first condition set is related to a first priority, or the first condition set comprises the action of receiving a first indication, or the first condition set is related to a cause of triggering the random access procedure.

In one embodiment, the first condition set is related to a logical channel, or the first condition set is related to a first priority.

In one embodiment, the first condition set is related to a logical channel, or the first condition set comprises the action of receiving a first indication.

In one embodiment, the first condition set is related to a logical channel, or the first condition set is related to a cause of triggering the random access procedure.

In one embodiment, the first condition set is related to a first priority, or the first condition set comprises the action of receiving a first indication.

In one embodiment, the first condition set is related to a first priority, or the first condition set is related to a cause of triggering the random access procedure.

In one embodiment, the first condition set comprises the action of receiving a first indication, or the first condition set is related to a cause of triggering the random access procedure.

In one embodiment, the first condition set is related to a logical channel, and the first condition set is related to a first priority, and the first condition set comprises the action of receiving a first indication.

In one embodiment, the first condition set is related to a logical channel, and the first condition set is related to a first priority, and the first condition set is related to a cause of triggering the random access procedure.

In one embodiment, the first condition set is related to a logical channel, and the first condition set comprises the action of receiving a first indication, and the first condition set is related to a cause of triggering the random access procedure.

In one embodiment, the first condition set is related to a first priority, and the first condition set comprises the action of receiving a first indication, and the first condition set is related to a cause of triggering the random access procedure.

In one embodiment, the first condition set is related to a logical channel, and the first condition set is related to a first priority, and the first condition set comprises the action of receiving a first indication, and the first condition set is related to a cause of triggering the random access procedure.

Embodiment 8

Embodiment 8 illustrates a schematic diagram illustrating a relation between a preamble resource group subset and a preamble resource group according to one embodiment of the present application, as shown in FIG. 8. In FIG. 8, the dashed-line ellipses respectively represent a first preamble resource group subset and a preamble resource group subset #n, of which the preamble resource group subset #n is any preamble resource group subset other than the first preamble resource group subset, n being a positive integer no greater than K3; the solid-line ellipses respectively represent a first preamble resource group and a preamble resource group #q, of which the preamble resource group #q is any preamble resource group other than the first preamble resource group, q being a positive integer no greater than K1; each ellipsis indicates the existence of other preamble resources, or other preamble resource groups or other preamble resource group subsets.

In one embodiment, K1 is equal to 2, and K3 is equal to 1.

In one embodiment, K1 is equal to 2, and K3 is equal to 2.

In one subembodiment, the first preamble resource group subset comprises a preamble group A, while the preamble resource group subset #n comprises a preamble group B.

In one subembodiment, the first preamble resource group subset comprises a preamble group B, while the preamble resource group subset #n comprises a preamble group A.

In one subembodiment, the first preamble resource group comprises a preamble group A, while the preamble resource group #q comprises a preamble group B.

In one subembodiment, the first preamble resource group comprises a preamble group B, while the preamble resource group #q comprises a preamble group A.

In one embodiment, K1 is greater than 2, and K3 is no less than 2.

In one embodiment, K1 is greater than 2, and K3 is equal to 1.

In one embodiment, the preamble resource group subset #n exists, so does the preamble resource group #q.

In one embodiment, the preamble resource group subset #n does not exist, nor does the preamble resource group #q.

In one embodiment, the preamble resource comprises a preamble sequence.

In one embodiment, the preamble resource comprises a random access occasion.

In one embodiment, the preamble resource comprises at least one of a time-domain resource (i.e., Time), or a frequency-domain resource (i.e., Frequency) or a code-domain resource (i.e., Preamble).

In one embodiment, each of the K3 preamble resource group subset(s) is associated with a preamble sequence.

In one embodiment, each of the K1 preamble resource group(s) is associated with a random access occasion.

In one embodiment, a preamble sequence is assigned to a preamble resource group subset, and a random access occasion with which the preamble sequence is associated is assigned to a preamble resource group.

In one embodiment, a random access occasion to which a preamble sequence corresponds is assigned to the first preamble resource group, while another random access occasion to which the preamble sequence corresponds is assigned to the preamble resource group #q.

Embodiment 9

Embodiment 9 illustrates a schematic diagram of a first condition set being related to a first priority according to one embodiment of the present application, as shown in FIG. 9.

In Embodiment 9, the first condition set is related to a first priority, the first priority being used to determine an order of resource allocation of the first sub-payload.

In one embodiment, the first priority is used to determine whether the first payload comprises a first sub-payload.

In one embodiment, the phrase that the first condition set is related to a first priority comprises that: a condition comprised in the first condition set is related to the first priority.

In one embodiment, the phrase that the first condition set is related to a first priority comprises that: the first priority is used to determine whether the first condition set is satisfied.

In one embodiment, the phrase that the first condition set is related to a first priority comprises that: whether the first condition set is satisfied is related to the first priority.

In one embodiment, the phrase that the first condition set is related to a first priority comprises that: the first condition set comprises the first priority.

In one embodiment, the phrase that the first priority is used to determine whether the first payload comprises a first sub-payload comprises: whether the first payload comprises the first sub-payload being related to the first priority.

In one embodiment, the phrase that the first priority is used to determine whether the first payload comprises a first sub-payload comprises: determining whether the first payload comprises the first sub-payload according to the first priority.

In one embodiment, the phrase that the first priority is used to determine whether the first payload comprises a first sub-payload comprises: that the first priority meets a first condition being used to determine that the first payload does not comprise the first sub-payload; that the first priority does not meet a first condition being used to determine that the first payload comprises the first sub-payload.

In one embodiment, the first priority comprises a Prioritised order of a logical channel of the first sub-payload.

In one subembodiment, a Prioritised order of a C-RNTI MAC CE or data from a UL-CCCH is higher than that of a Configured Grant Confirmation MAC CE or a BFR MAC CE or a Multiple Entry Configured Grant Confirmation MAC CE.

In one subembodiment, a Prioritised order of a C-RNTI MAC CE or data from a UL-CCCH is higher than that of data from any logical channel other than a UL-CCCH.

In one subembodiment, a Prioritised order of data of a DRB for SDT is higher than that of a MAC CE of any BSR other than a BSR carrying padding bits.

In one subsidiary embodiment of the above subembodiment, when the first resource pool can transmit all of data of a DRB used for SDT, but remaining resources are not sufficient enough for transmitting a BSR, the first payload comprises all of the data of the DRB for SDT but not the BSR.

In one subsidiary embodiment of the above subembodiment, the first sub-payload comprises a BSR.

In one subembodiment, a Prioritised order of a MAC CE of any BSR other than a BSR carrying padding bits is higher than that of data of a DRB for SDT.

In one subsidiary embodiment of the above subembodiment, when the first resource pool can transmit data of a DRB used for SDT, but remaining resources are not sufficient enough for transmitting a BSR, the first payload comprises part of the data of the DRB for SDT as well as the BSR.

In one subsidiary embodiment of the above subembodiment, the first sub-payload comprises part of data of a DRB used for SDT.

In one subsidiary embodiment of the above subembodiment, when the cause of the random access procedure includes a RA-based SDT, the first resource pool is used for transmitting a BSR, and the BSR cannot be canceled.

In one subembodiment, a Prioritised order of data of a DRB for SDT is higher than that of a SL-BSR.

In one subembodiment, a Prioritised order of data of a DRB for SDT is higher than that of a sidelink-related MAC CE, where the sidelink-related MAC CE includes at least one of a Sidelink Configured Grant Confirmation MAC CE or a MAC CE of prioritized SL-BSR or a SL-BSR MAC CE.

In one subembodiment, a Prioritised order of a sidelink-related MAC CE is higher than that of data of a DRB for SDT.

In one subembodiment, when a Prioritised order of a logical channel of the first sub-payload is higher than that of one or more of logical channels among other data-carrying logical channels, the first payload comprises the first sub-payload.

In one subembodiment, when a Prioritised order of a logical channel of the first sub-payload is lower than that of one or more of logical channels among other data-carrying logical channels, the first payload does not comprise the first sub-payload.

In one embodiment, the Prioritised order of logical channels is presented in a descending manner as follows: a C-RNTI MAC CE or data from a UL-CCCH, a Configured Grant Confirmation MAC CE or a BFR MAC CE or a Multiple Entry Configured Grant Confirmation MAC CE, a Sidelink Configured Grant Confirmation MAC CE, a LBT failure MAC CE, a prioritized SL-BSR MAC CE, a MAC CE of a BSR other than a BSR carrying padding bits, a Single Entry PHR MAC CE or a Multiple Entry PHR MAC CE, a MAC CE of a number of Desired Guard Symbols, a MAC CE of a Pre-emptive BSR, a MAC CE of a SL-BSR other than a prioritized SL-BSR and a SL-BSR carrying padding bits, data of any logical channel other than a UL-CCCH, a MAC CE of a Recommended bit rate query, a MAC CE of a BSR carrying padding bits, and a MAC CE of a SL-BSR carrying padding bits.

In one embodiment, the first priority comprises Bj of a logical channel of the first sub-payload.

In one subembodiment, the greater the Bj, the higher the priority.

In one subembodiment, for the definition of the Bj and its calculation method, refer to 3GPP TS 38.321, Section 5.4.3.

In one subembodiment, for the definition of the Bj and its calculation method, refer to 3GPP TS 36.321, Section 5.4.3.

In one subembodiment, when the Bj is greater than or is no less than a first given value, the first payload comprises the first sub-payload.

In one subembodiment, when the Bj is no less than or is greater than a first given value, the first payload does not comprise the first sub-payload.

In one subembodiment, the first given value is configured through an RRC message.

In one embodiment, the first priority comprises a priority of a logical channel of the first sub-payload.

In one subembodiment, the priority of the logical channel of the first sub-payload is configured by an RRC signaling.

In one subembodiment, the RRC signaling for configuring the priority of the logical channel of the first sub-payload indicates a number between 1 and 16, inclusively.

In one subembodiment, the RRC signaling for configuring the priority of the logical channel of the first sub-payload indicates a number between 1 and 8, inclusively.

In one subembodiment, the smaller the number between 1 and 16 inclusively, the higher the priority.

In one subembodiment, the smaller the number between 1 and 8 inclusively, the higher the priority.

In one subembodiment, when the priority of the logical channel of the first sub-payload is no greater than or is less than a second given value, the first payload comprises the first sub-payload.

In one subembodiment, when the priority of the logical channel of the first sub-payload is greater than or is no less than a second given value, the first payload does not comprise the first sub-payload.

In one subembodiment, the second given value is configured through an RRC message.

In one subembodiment, the RRC signaling for configuring the priority of the logical channel of the first sub-payload comprises a RRCReconfiguration message.

In one subembodiment, the RRC signaling for configuring the priority of the logical channel of the first sub-payload comprises a RRCResume message.

In one subembodiment, the RRC signaling for configuring the priority of the logical channel of the first sub-payload comprises a RRCSetup message.

In one subembodiment, the RRC signaling for configuring the priority of the logical channel of the first sub-payload comprises an IE, the IE comprising LogicalChannelConfig.

In one subembodiment, the RRC signaling for configuring the priority of the logical channel of the first sub-payload comprises an IE, the IE comprising RLC-BearerConfig.

In one subembodiment, the RRC signaling for configuring the priority of the logical channel of the first sub-payload comprises an IE, the IE comprising CellGroupConfig.

In one subembodiment, the RRC signaling for configuring the priority of the logical channel of the first sub-payload comprises a field, the field comprising priority.

In one subembodiment, the RRC signaling for configuring the priority of the logical channel of the first sub-payload comprises a field, the field comprising mac-LogicalChannelConfig.

In one embodiment, the phrase of the first priority being used to determine an order of resource allocation of the first sub-payload comprises: determining the order of resource allocation of the first sub-payload according to the first priority.

In one embodiment, the phrase of the first priority being used to determine an order of resource allocation of the first sub-payload comprises: the order of resource allocation of the first sub-payload being dependent on the first priority.

In one embodiment, the phrase of the first priority being used to determine an order of resource allocation of the first sub-payload comprises: allocating resources in the first resource pool to the first sub-payload according to the first priority.

In one embodiment, the phrase of the first priority being used to determine an order of resource allocation of the first sub-payload comprises: allocating resources in the first resource pool to the first sub-payload and data of other logical channels according to the first priority.

Embodiment 10

Embodiment 10 illustrates a schematic diagram of determining a first preamble resource group subset according to a size of a first payload and a first offset according to one embodiment of the present application, as shown in FIG. 10.

In Embodiment 10, a first preamble resource group subset is determined out of the K1 preamble resource group(s) according to a size of the first payload and the first offset; the first signaling indicates the first offset, the first offset comprising at least one bit.

In one embodiment, the phrase that the first signaling indicates the first offset comprises that: the first signaling comprises the first payload threshold and the second payload threshold, the first payload threshold and the second payload threshold being used to determine the first offset.

In one embodiment, the phrase that the first signaling indicates the first offset comprises that: the first signaling comprises the first payload threshold and the first offset, the first offset being used to determine the second payload threshold.

In one embodiment, the phrase that the first signaling indicates the first offset comprises that: the first signaling explicitly indicates the first offset.

In one subembodiment, the first signaling comprises the first offset.

In one subembodiment, the first offset is a field in the first signaling.

In one subembodiment, the first signaling comprises the first payload threshold and the first offset.

In one subembodiment, the first payload threshold and the first offset are used to determine the second payload threshold.

In one subembodiment, a sum of the first payload threshold and the first offset is equal to the second payload threshold.

In one subembodiment, the first offset comprises a field in the first signaling, where a name of the field includes at least one of ra-, or Msg3, or MsgA, or Size, or GroupA, or sdt, or inactive, or small, or data, or drb, or transmission or offset.

In one embodiment, the phrase that the first signaling indicates the first offset comprises that: the first signaling implicitly indicates the first offset.

In one subembodiment, the first signaling comprises the second payload threshold.

In one subembodiment, the first signaling comprises the first payload threshold and the second payload threshold.

In one subembodiment, the first offset is obtained according to the first payload threshold and the second payload threshold.

In one subembodiment, an absolute value of a difference between the second payload threshold and the first payload threshold is equal to an absolute value of the first offset.

In one subembodiment, the second payload threshold comprises a field in the first signaling, where a name of the field includes at least one of ra-, or Msg3, or MsgA, or Size, or GroupB, or sdt, or inactive, or small, or data, or drb, or transmission.

In one embodiment, the first signaling comprises the first payload threshold.

In one embodiment, the first payload threshold comprises a field in the first signaling, where a name of the field includes ra-Msg3SizeGroupA.

In one embodiment, the first payload threshold comprises a field in the first signaling, where a name of the field includes ra-MsgA-SizeGroupA.

In one embodiment, the first payload threshold comprises a field in the first signaling, where a name of the field includes messageSizeGroupA.

In one embodiment, the first payload threshold comprises a field in the first signaling, where a name of the field includes at least one of ra-, or Msg3, or MsgA, or Size, or GroupA, or sdt, or inactive, or small, or data, or drb, or transmission.

In one embodiment, the phrase that the first signaling indicates the first offset comprises that: the first offset is configured through the first signaling.

In one embodiment, the phrase that the first signaling indicates the first offset comprises that: an IE or a field in the first signaling indicates the first offset.

In one embodiment, when a cause of the random access procedure includes SDT will the first offset be applied; when a cause of the random access procedure does not include SDT, the first offset is not applied.

In one embodiment, the at least one bit include a positive integer number of bit(s).

In one embodiment, the at least one bit include a positive integer number of byte(s).

In one embodiment, the phrase that a first preamble resource group subset is determined out of the K1 preamble resource group(s) according to a size of the first payload and the first offset comprises: determining a first preamble resource group subset out of the K1 preamble resource group(s) according to how the size of the first payload relates to the first offset and the first payload threshold.

In one embodiment, the phrase that a first preamble resource group subset is determined out of the K1 preamble resource group(s) according to a size of the first payload and the first offset comprises: determining a first preamble resource group subset out of the K1 preamble resource group(s) according to how the size of the first payload relates to the first payload threshold and the second payload threshold.

In one embodiment, the phrase that a first preamble resource group subset is determined out of the K1 preamble resource group(s) according to a size of the first payload and the first offset comprises: determining a first preamble resource group subset out of the K1 preamble resource group(s) according to how the size of the first payload relates to the second payload threshold.

In one embodiment, the second payload threshold is greater than or is no less than the first payload threshold.

In one embodiment, when a size of the first payload is no greater than or is smaller than the second payload threshold, the first preamble resource group subset comprises a preamble Group A; when a size of the first payload is no smaller than or is greater than the second payload threshold, the first preamble resource group subset comprises a preamble Group B.

In one embodiment, when a size of the first payload is no greater than or is smaller than the second payload threshold, the first preamble resource group subset comprises a preamble Group A; when a size of the first payload is no smaller than or is greater than the second payload threshold, and when a pathloss is no greater than or is smaller than a first given threshold, the first preamble resource group subset comprises a preamble Group B; when a size of the first payload is no smaller than or is greater than the second payload threshold, and when a pathloss is no smaller than or is greater than the first given threshold, the first preamble resource group subset comprises a preamble Group B.

In one embodiment, when a size of the first payload is no greater than or is smaller than a sum of the second payload threshold and the first offset, the first preamble resource group subset comprises a preamble Group A; when a size of the first payload is no smaller than or is greater than a sum of the first payload threshold and the first offset, the first preamble resource group subset comprises a preamble Group B.

In one embodiment, when a size of the first payload is no greater than or is smaller than a sum of the second payload threshold and the first offset, the first preamble resource group subset comprises a preamble Group A; when a size of the first payload is no smaller than or is greater than a sum of the first payload threshold and the first offset, and when a pathloss is no greater than or is smaller than the first given threshold, the first preamble resource group subset comprises a preamble Group B; when a size of the first payload is no smaller than or is greater than a sum of the first payload threshold and the first offset, and when a pathloss is no smaller than or is greater than the first given threshold, the first preamble resource group subset comprises a preamble Group B.

In one embodiment, when a size of the first payload is no greater than or is smaller than the first payload threshold, the first preamble resource group subset comprises a preamble Group A; when a size of the first payload is no smaller than or is greater than the first payload threshold, and the size of the first payload is no greater than or is smaller than the second payload threshold, the first preamble resource group subset comprises a preamble Group B; when a size of the first payload is no smaller than or is greater than the second payload threshold, the first preamble resource group subset comprises a preamble Group A.

In one embodiment, when a size of the first payload is no greater than or is smaller than the first payload threshold, the first preamble resource group subset comprises a preamble Group A; when a size of the first payload is no smaller than or is greater than the first payload threshold, and the size of the first payload is no greater than or is smaller than the second payload threshold, and a pathloss is no greater than or is smaller than the first given threshold, the first preamble resource group subset comprises a preamble Group B; when a size of the first payload is no smaller than or is greater than the second payload threshold, the first preamble resource group subset comprises a preamble Group A.

In one embodiment, when a size of the first payload is no greater than or is smaller than the first payload threshold, the first preamble resource group subset comprises a preamble Group A; when a size of the first payload is no smaller than or is greater than the first payload threshold, and the size of the first payload is no greater than or is smaller than the second payload threshold, the first preamble resource group subset comprises a preamble Group B; when a size of the first payload is no smaller than or is greater than the second payload threshold, and a pathloss is no greater than or is smaller than the first given threshold, the first preamble resource group subset comprises a preamble Group B; when a size of the first payload is no smaller than or is greater than the second payload threshold, and a pathloss is no smaller than or is greater than the first given threshold, the first preamble resource group subset comprises a preamble Group A.

In one embodiment, the first given threshold is configurable.

In one embodiment, the first given threshold is pre-configured.

In one embodiment, the first given threshold includes a power value.

In one embodiment, a unit in which the first given threshold is measured includes dBm.

In one embodiment, the first given threshold is obtained by calculation based on parameters configured by an RRC message.

In one embodiment, the first given threshold includes PCMAX—preambleReceivedTargetPower—msg3-DeltaPreamble—messagePowerOffsetGroupB, where the definitions of the PCMAX, the preambleReceivedTargetPower, the msg3-DeltaPreamble and the messagePowerOffsetGroupB can be found in TS38.331.

In one embodiment, the first given threshold includes PCMAX—msgA-PreambleReceivedTargetPower—msgA-DeltaPreamble—messagePowerOffsetGroupB, where the definitions of the PCMAX, the msgA-PreambleReceivedTargetPower, the msgA-DeltaPreamble and the messagePowerOffsetGroupB can be found in TS38.331.

In one embodiment, the first given threshold includes $PC_{MAX,c}$—preambleInitialReceivedTargetPower—deltaPreambleMsg3—messagePowerOffsetGroupB, where the definitions of the $PC_{MAX,c}$, the preambleInitialReceivedTargetPower, the deltaPreambleMsg3 and the messagePowerOffsetGroupB can be found in TS36.331.

Embodiment 11

Embodiment 11 illustrates a schematic diagram of a first condition set being related to a cause of triggering a random access procedure according to one embodiment of the present application, as shown in FIG. 11.

In Embodiment 11, the first condition set is related to a cause of triggering the random access procedure.

In one embodiment, the cause of triggering the random access procedure is used to determine whether the first payload comprises a first sub-payload.

In one embodiment, the cause of triggering the random access procedure comprises: starting a RA-based SDT.

In one subembodiment, the RA-based SDT comprises a Small Data Transmission.

In one subembodiment, the RA-based SDT comprises transmitting a package in an RRC Inactive state.

In one subembodiment, the RA-based SDT comprises transmitting a package via a DRB in an RRC Inactive state.

In one subembodiment, the RA-based SDT comprises an Early Data Transmission (EDT).

In one subembodiment, the RA-based SDT comprises transmitting a package via an Msg3 or an MsgA in an RRC_INACTIVE state.

In one subembodiment, the RA-based SDT comprises transmitting a package via an Msg3 or an MsgA in an RRC_IDLE state.

In one subembodiment, the RA-based SDT comprises transmitting a package on one or more DRBs via an Msg3 or an MsgA in an RRC_IDLE state.

In one embodiment, the cause of triggering the random access procedure comprises: when performing a RA-based EDT.

In one embodiment, the cause of triggering the random access procedure comprises: when transmitting data via a DRB in an RRC Inactive state.

In one embodiment, the cause of triggering the random access procedure comprises: during inter-cell handover.

In one embodiment, the cause of triggering the random access procedure comprises: when performing RNA update.

In one embodiment, the cause of triggering the random access procedure comprises: when there arrives downlink data in an RRC_CONNECTED state.

In one embodiment, the cause of triggering the random access procedure comprises: when there arrives uplink data in an RRC_CONNECTED state.

In one embodiment, the cause of triggering the random access procedure comprises: when an uplink synchronization status is non-synchronised.

In one embodiment, the cause of triggering the random access procedure comprises: when transiting from an RRC_INACTIVE state to an RRC Connected state.

In one embodiment, the cause of triggering the random access procedure comprises: when transiting from an RRC_IDLE state to an RRC Connected state.

In one embodiment, the cause of triggering the random access procedure comprises: when there arrives data in an RRC Connected state and no available PUCCH resources can be used for SR.

In one embodiment, the cause of triggering the random access procedure comprises: when constant uplink Listen Before Talk (LBT) failures occur in a Special Cell (SpCell).

In one embodiment, the cause of triggering the random access procedure comprises: when a Beam Failure Recovery (BFR) occurs.

In one embodiment, the cause of triggering the random access procedure comprises: when requesting for Other System Information (SI).

In one embodiment, the phrase that the first condition set is related to a cause of triggering the random access procedure comprises: determining whether a condition in the first condition set is being satisfied according to the cause of triggering the random access procedure.

In one embodiment, the phrase that the first condition set is related to a cause of triggering the random access procedure comprises: when the cause of triggering the random access procedure includes RA-based SDT, a condition in the first condition set is satisfied.

In one embodiment, the phrase that the first condition set is related to a cause of triggering the random access procedure comprises: when the cause of triggering the random access procedure does not include RA-based SDT, the first condition set is unsatisfied.

In one embodiment, when the cause of triggering the random access procedure includes RA-based SDT, the first payload does not comprise the first sub-payload.

In one embodiment, when the cause of triggering the random access procedure includes EDT, the first payload does not comprise the first sub-payload.

Embodiment 12

Figures 12, 13, 14:
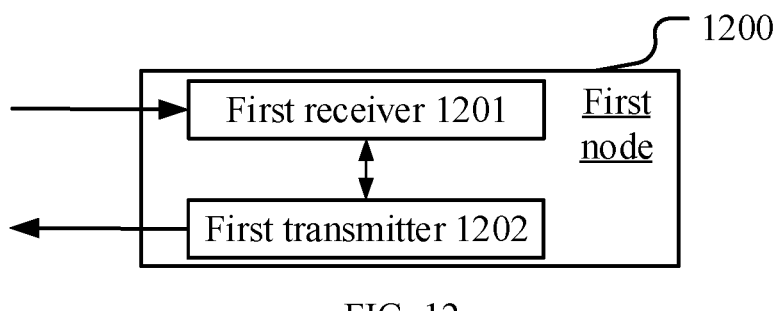
FIG. 12 illustrates a structure block diagram of a processing device used in a first node according to one embodiment of the present application.
FIG. 13 illustrates a structure block diagram of a processing device used in a second node according to one embodiment of the present application.
FIG. 14 illustrates a schematic diagram of a first principle being used to select a first preamble resource from a first preamble resource group subset according to one embodiment of the present application.

Embodiment 12 illustrates a structure block diagram of a processing device used in a first node according to one embodiment of the present application; as shown in FIG. 12. In FIG. 12, a processing device 1200 in a first node is comprised of a first receiver 1201 and a first transmitter 1202.

The first receiver 1201 receives a first signaling, the first signaling being used to determine K1 preamble resource group(s); and the first transmitter 1202 determines a first payload; determines a first preamble resource group subset out of the K1 preamble resource group(s) according to a size of the first payload; selects a first preamble resource in the first preamble resource group subset, and transmits a first message; transmits a third message on a first resource pool;

the first receiver 1201, as a response to the action of transmitting a first message, receives a second message.

In Embodiment 12, each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, a first preamble resource group subset is determined out of the K1 preamble resource group(s) according to a size of the first payload and the first offset; the first signaling indicates the first offset, the first offset comprising at least one bit.

In one embodiment, the first condition set is related to a first priority, the first priority being used to determine an order of resource allocation of the first sub-payload.

In one embodiment, the first transmitter 1202 determines a second payload; transmits a fourth message on a second resource pool, the fourth message carrying all or part of the second payload; the first receiver 1201 receives a first indication, the first indication being used to determine a failure of transmitting the fourth message; herein, the first condition set comprises the action of receiving a first indication; there is at least one identical sub-payload shared by the first payload and the second payload.

In one embodiment, the first condition set is related to a cause of triggering the random access procedure.

In one embodiment, the first receiver 1201 receives a fifth message as a response to the action of transmitting a third message on a first resource pool; herein, the third message comprises a buffer status report (BSR), while the fifth message indicates a third resource pool.

In one embodiment, a first preamble resource is selected from the first preamble resource group subset according to a first principle, the first principle comprising the probability distribution of preamble resources in the first preamble resource group subset.

In one embodiment, the first receiver 1201 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1201 comprises the antenna 452, the receiver 454, the multi-antenna receiving processor 458 and the receiving processor 456 in FIG. 4 of the present application.

In one embodiment, the first receiver 1201 comprises the antenna 452, the receiver 454 and the receiving processor 456 in FIG. 4 of the present application.

In one embodiment, the first transmitter 1202 comprises the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1202 comprises the antenna 452, the transmitter 454, the multi-antenna transmitting processor 457 and the transmitting processor 468 in FIG. 4 of the present application.

In one embodiment, the first transmitter 1202 comprises the antenna 452, the transmitter 454 and the transmitting processor 468 in FIG. 4 of the present application.

Embodiment 13

Embodiment 13 illustrates a structure block diagram of a processing device used in a second node according to one embodiment of the present application; as shown in FIG. 13. In FIG. 13, a processing device 1300 in a second node is comprised of a second transmitter 1301 and a second receiver 1302.

The second transmitter 1301 transmits a first signaling, the first signaling being used to determine K1 preamble resource group(s); and the second receiver 1302 receives a first message; receives a third message on a first resource pool;

the second transmitter 1301 transmits a second message as a response to the action of receiving a first message.

In Embodiment 13, a first payload is determined; a first preamble resource group subset is determined out of the K1 preamble resource group(s) according to a size of the first payload, and a first preamble resource is selected from the first preamble resource group subset; each preamble resource group of the K1 preamble resource group(s) comprises at least one preamble resource, and each preamble resource in the K1 preamble resource group(s) is used for a random access procedure; the first preamble resource group subset comprises at least one preamble resource group; the first message is associated with the first preamble resource; a first condition set is used to determine whether the first payload comprises a first sub-payload, the first sub-payload not being rejected by the first resource pool, where K1 is a positive integer no less than 1; the first condition set is related to a logical channel; the third message carries all or part of the first payload; a size of the first resource pool is related to the first preamble resource group subset.

In one embodiment, a first preamble resource group subset is determined out of the K1 preamble resource group(s) according to a size of the first payload and the first offset; the first signaling indicates the first offset, the first offset comprising at least one bit.

In one embodiment, the first condition set is related to a first priority, the first priority being used to determine an order of resource allocation of the first sub-payload.

In one embodiment, the second receiver 1302 monitors a fourth message on a second resource pool, the fourth message carrying all or part of a second payload. herein, the second payload is determined; a first indication is received, the first indication being used to determine a failure of transmitting the fourth message; the first condition set comprises the action of receiving a first indication; there is at least one identical sub-payload shared by the first payload and the second payload.

In one embodiment, the first condition set is related to a cause of triggering the random access procedure.

In one embodiment, the second transmitter 1301 transmits a fifth message as a response to the action of receiving a third message on a first resource pool; herein, the third message comprises a buffer status report (BSR), while the fifth message indicates a third resource pool.

In one embodiment, a first preamble resource is selected from the first preamble resource group subset according to a first principle, the first principle comprising the probability distribution of preamble resources in the first preamble resource group subset.

In one embodiment, the second transmitter 1301 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1301 comprises the antenna 420, the transmitter 418, the multi-antenna transmitting processor 471 and the transmitting processor 416 in FIG. 4 of the present application.

In one embodiment, the second transmitter 1301 comprises the antenna 420, the transmitter 418 and the transmitting processor 416 in FIG. 4 of the present application.

In one embodiment, the second receiver 1302 comprises the antenna 420, the receiver 418, the multi-antenna receiving processor 472, the receiving processor 470, the controller/processor 475 and the memory 476 in FIG. 4 of the present application.

In one embodiment, the second receiver 1302 comprises the antenna 420, the receiver 418, the multi-antenna receiving processor 472 and the receiving processor 470 in FIG. 4 of the present application.

In one embodiment, the second receiver 1302 comprises the antenna 420, the receiver 418 and the receiving processor 470 in FIG. 4 of the present application.

Embodiment 14

Embodiment 14 illustrates a schematic diagram of a first principle being used to select a first preamble resource from a first preamble resource group subset according to one embodiment of the present application, as shown in FIG. 14.

In Embodiment 14, a first preamble resource is selected from the first preamble resource group subset according to a first principle, the first principle comprising the probability distribution of preamble resources in the first preamble resource group subset.

In one embodiment, the probability distribution of preamble resources in the first preamble resource group subset is used to determine a probability at which each preamble resource in the first preamble resource group subset is selected as the first preamble resource.

In one embodiment, the probability distribution of preamble resources in the first preamble resource group subset is subject to equal-probability distribution.

In one embodiment, the probability distribution of preamble resources in the first preamble resource group subset is not subject to equal-probability distribution.

In one embodiment, the probability distribution of preamble resources in the first preamble resource group subset is subject to Poisson distribution.

In one embodiment, the probability distribution of preamble resources in the first preamble resource group subset is subject to Normal/Gauss distribution.

In one embodiment, the probability distribution of preamble resources in the first preamble resource group subset is subject to predefined-probability distribution.

In one embodiment, the first principle is related to a number of times a preamble sequence is transmitted in a same random access procedure.

In one embodiment, the first principle is related to a number of times an Msg3 or an MsgA is transmitted in random access procedures.

In one embodiment, each preamble resource in the first preamble resource group subset is selected at equal probability as the first preamble resource.

In one embodiment, preamble resources in the first preamble resource group subset are sequentially indexed by 1, 2 . . . , and Q1, and a random number is generated from 1 to Q1 for selecting a preamble resource indexed by the random number as the first preamble resource.

In one embodiment, each of the K2 preamble resource group(s) in the first preamble resource group subset comprises the first preamble resource with equal probability.

In one embodiment, the K2 preamble resource groups in the first preamble resource group subset comprise the first preamble resource with unequal probabilities.

In one embodiment, the first node selects a first preamble resource from the first preamble resource group subset according to the probability distribution of preamble resources in the first preamble resource group subset.

In one embodiment, the first node itself selects a first preamble resource from the first preamble resource group subset.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A method, implemented in a user equipment (UE), the method comprising:
   receiving a comprising an offset comprising at least one bit and configuration information defining K1 preamble resource groups, wherein each of the K1 preamble resource groups comprises at least one random access preamble resource, and K1 is a positive integer no less than 1;
   determining the K1 preamble resource groups using the configuration information;
   determining a first payload comprising uplink data associated with a logical channel;
   determining a preamble resource group subset from among the K1 preamble resource groups according to a size of the first payload and the offset;
   selecting a preamble resource belonging to the preamble resource group subset;
   transmitting a first message using the preamble resource;
   receiving, in response to transmitting the first message, a second message comprising information identifying a first resource pool, a size of the first resource pool being related to the preamble resource group subset;
   determining whether the first payload comprises a sub-payload using a condition set associated with the logical channel, the sub-payload being data admissible for transmission using the first resource pool;
   transmitting a third message using the first resource pool, the third message carrying all or a part of the first payload.

2. The method according to claim 1, wherein the condition set comprises a first priority, the first priority defining an order of resource allocation for the sub-payload.

3. The method according to claim 2, wherein the first priority determines whether the first payload comprises the sub-payload.

4. The method according to claim 3, wherein the first priority comprises a prioritized order of a logical channel of the sub-payload.

5. The method according to claim 3, wherein the first priority comprises a priority parameter (Bj) defined for the logical channel of the sub-payload, wherein a value of Bj increases with higher logical channel priority.

6. The method according to claim 1, further comprising:
   determining a second payload;
   transmitting a fourth message using a second resource pool, the fourth message carrying all or part of the second payload; and
   receiving an indication identifying a failure in transmitting the fourth message;

wherein the condition set comprises receipt of the indication, and wherein the first payload and the second payload share at least one identical sub-payload.

7. The method according to claim 1, wherein the condition set is related to a cause of triggering a random access procedure.

8. The method according to claim 7, wherein when the cause of triggering the random access procedure includes RA-based SDT, the condition set is satisfied, and when the cause does not include RA-based SDT, the condition set is unsatisfied.

9. The method according to claim 1, further comprising:
   receiving a fifth message in response to the transmitting of the third message using the first resource pool,
   wherein the third message comprises a buffer status report (BSR), and the fifth message identifies a third resource pool.

10. The method according to claim 1, wherein the preamble resource is selected from the preamble resource group subset according to a principle comprising a probability distribution over preamble resources in the preamble resource group subset.

11. The method according to claim 1, wherein when the condition set is satisfied, the first payload comprises the sub-payload, and when the condition set is unsatisfied, the first payload does not comprise the sub-payload.

12. The method according to claim 1, wherein when the condition set is satisfied, the first payload does not comprise the sub-payload, and when the condition set is unsatisfied, the first payload comprises the sub-payload.

13. The method according to claim 1, wherein the sub-payload corresponds to the logical channel, and the logical channel corresponds to a Common Control Channel (CCCH).

14. The method according to claim 1, wherein the determining the preamble resource group subset according to the size of the first payload comprises determining the preamble resource group subset according to the size of the first payload and a pathloss value.

15. The method according to claim 1, wherein the preamble resource group subset consists of one preamble resource group.

16. The method according to claim 1, wherein K1 is equal to 2.

17. A base station comprising:
   a transceiver; and
   a processor communicatively coupled to the transceiver and configured to:
      transmit a signal, comprising an offset comprising at least one bit and configuration information defining K1 preamble resource groups, wherein: each of the K1 preamble resource groups comprises at least one random access preamble resource, K1 is a positive integer no less than 1, and the K1 preamble resource groups are derived from the configuration information,
      receive a first message in a preamble resource that belongs to a preamble resource group subset determined according to a size of a payload and the offset, the payload comprising uplink data associated with a logical channel,
      transmit, in response to the first message, a second message comprising information identifying a resource pool, a size of the resource pool being related to the preamble resource group subset, and
      receive a third message in resources in the resource pool, wherein: the third message carries all or a part of the payload, the payload comprises or excludes a sub-payload according to a condition set associated with the logical channel, the sub-payload is admissible for transmission using the resource pool, and a size of the resource pool is related to the preamble resource group subset.

18. A user equipment (UE) comprising:

a transceiver; and a processor communicatively coupled to the transceiver and configured to:

receive a signal comprising an offset comprising at least one bit and configuration information defining K1 preamble resource group, wherein each of the K1 preamble resource groups comprises at least one random access preamble resource, and K1 is a positive integer no less than 1, determine the K1 preamble resource groups using the configuration information, determine a payload comprising uplink data associated with a logical channel, determine a preamble resource group subset from among the K1 preamble resource groups according to a size of the payload and the offset, select a preamble resource belonging to the preamble resource group subset, transmit a first message using the preamble resource, receive, in response to transmitting the first message, a second message comprising information identifying a resource pool, a size of the resource pool being related to the preamble resource group subset, determine whether the payload comprises a sub-payload using a condition set associated with the logical channel, the sub-payload being data admissible for transmission using the resource pool, and transmit a third message using the resource pool, the third message carrying all or a part of the payload.

19. A method, implemented in a base station, the method comprising:

transmitting a first signal comprising an offset comprising at least one bit and configuration information defining K1 preamble resource groups, wherein: each of the K1 preamble resource groups comprises at least one random access preamble resource, K1 is a positive integer no less than 1, and the K1 preamble resource groups are derived from the configuration information;

receiving a first message in a preamble resource that belongs to a preamble resource group subset determined according to a size of a payload and the offset, the payload comprising uplink data associated with a logical channel;

transmitting, in response to the first message, a second message comprising information identifying a resource pool, a size of the resource pool being related to the preamble resource group subset; and receiving a third message in resources in the resource pool, wherein: the third message carries all or a part of the payload, the payload comprises or excludes a sub-payload according to a condition set associated with the logical channel, the sub-payload is admissible for transmission using the resource pool, and a size of the resource pool is related to the preamble resource group subset.

* * * * *